(12) United States Patent
Hastings

(10) Patent No.: US 11,580,338 B2
(45) Date of Patent: Feb. 14, 2023

(54) DIGITAL UNPACKING OF CT IMAGERY

(71) Applicant: The Government of the United States of America, as represented by the Secretary of Homeland Security, Washington, DC (US)

(72) Inventor: William Hastings, Alexandria, VA (US)

(73) Assignee: The Government of the United States of America, as represented bv the Secretan/ of Homeland Security, Washington, DC (US)

( * ) Notice: Subject to any disclaimer, the term of this patent is extended or adjusted under 35 U.S.C. 154(b) by 0 days.

(21) Appl. No.: 17/735,684

(22) Filed: May 3, 2022

(65) Prior Publication Data
US 2022/0292295 A1   Sep. 15, 2022

Related U.S. Application Data

(62) Division of application No. 17/499,537, filed on Oct. 12, 2021, now Pat. No. 11,373,068.

(60) Provisional application No. 63/160,450, filed on Mar. 12, 2021.

(51) Int. Cl.
| | |
|---|---|
| *G06K 9/00* | (2022.01) |
| *G06K 9/62* | (2022.01) |
| *G06V 10/70* | (2022.01) |
| *G06F 3/0481* | (2022.01) |
| *G06F 3/0484* | (2022.01) |
| *G06V 10/764* | (2022.01) |
| *G06T 7/70* | (2017.01) |

(52) U.S. Cl.
CPC ........... *G06K 9/628* (2013.01); *G06F 3/0481* (2013.01); *G06F 3/0484* (2013.01); *G06T 7/70* (2017.01); *G06V 10/764* (2022.01); *G06V 10/768* (2022.01); *G06T 2200/24* (2013.01); *G06T 2207/10081* (2013.01); *G06T 2207/20092* (2013.01)

(58) Field of Classification Search
CPC .................................................... G01N 23/04
See application file for complete search history.

(56) References Cited

U.S. PATENT DOCUMENTS 7,231,327 B1 * 6/2007 Beverina .............. G06Q 20/203
                                                                 703/2
10,504,261 B2 * 12/2019 Cinnamon ........... G06Q 50/265
(Continued)

*Primary Examiner* — Hadi Akhavannik
(74) *Attorney, Agent, or Firm* — Lavanya Ratnam; Robert W. Busby; William Washington

(57) ABSTRACT

An improvement to automatic classifying of threat level of objects in CT scan images of container content, methods include automatic identification of non-classifiable threat level object images, and displaying on a display of an operator a de-cluttered image, to improve operator efficiency. The de-cluttered image includes, as subject images, the non-classifiable threat level object images. Improvement to resolution of non-classifiable threat objects includes computer-directed prompts for the operator to enter information regarding the subject image and, based on same, identifying the object type. Improvement to automatic classifying of threat levels includes incremental updating the classifying, using the determined object type and the threat level of the object type.

18 Claims, 25 Drawing Sheets

(56) References Cited

U.S. PATENT DOCUMENTS

| | | | |
|---|---|---|---|
| 2003/0233278 A1* | 12/2003 | Marshall | G06Q 30/00 |
| | | | 705/14.35 |
| 2007/0041613 A1* | 2/2007 | Perron | G01V 5/0008 |
| | | | 382/103 |
| 2009/0175411 A1* | 7/2009 | Gudmundson | G01V 5/0083 |
| | | | 378/57 |
| 2010/0046704 A1* | 2/2010 | Song | G01N 23/04 |
| | | | 378/57 |
| 2012/0158620 A1* | 6/2012 | Paquet | G06N 20/00 |
| | | | 706/12 |
| 2014/0219526 A1* | 8/2014 | Linguraru | G06V 40/16 |
| | | | 382/128 |
| 2017/0357807 A1* | 12/2017 | Harms | G06F 21/562 |
| 2019/0019318 A1* | 1/2019 | Cinnamon | G06T 7/73 |
| 2020/0382543 A1* | 12/2020 | Hoopes | H04L 63/20 |
| 2021/0250369 A1* | 8/2021 | Åvist | H04L 63/1408 |

* cited by examiner

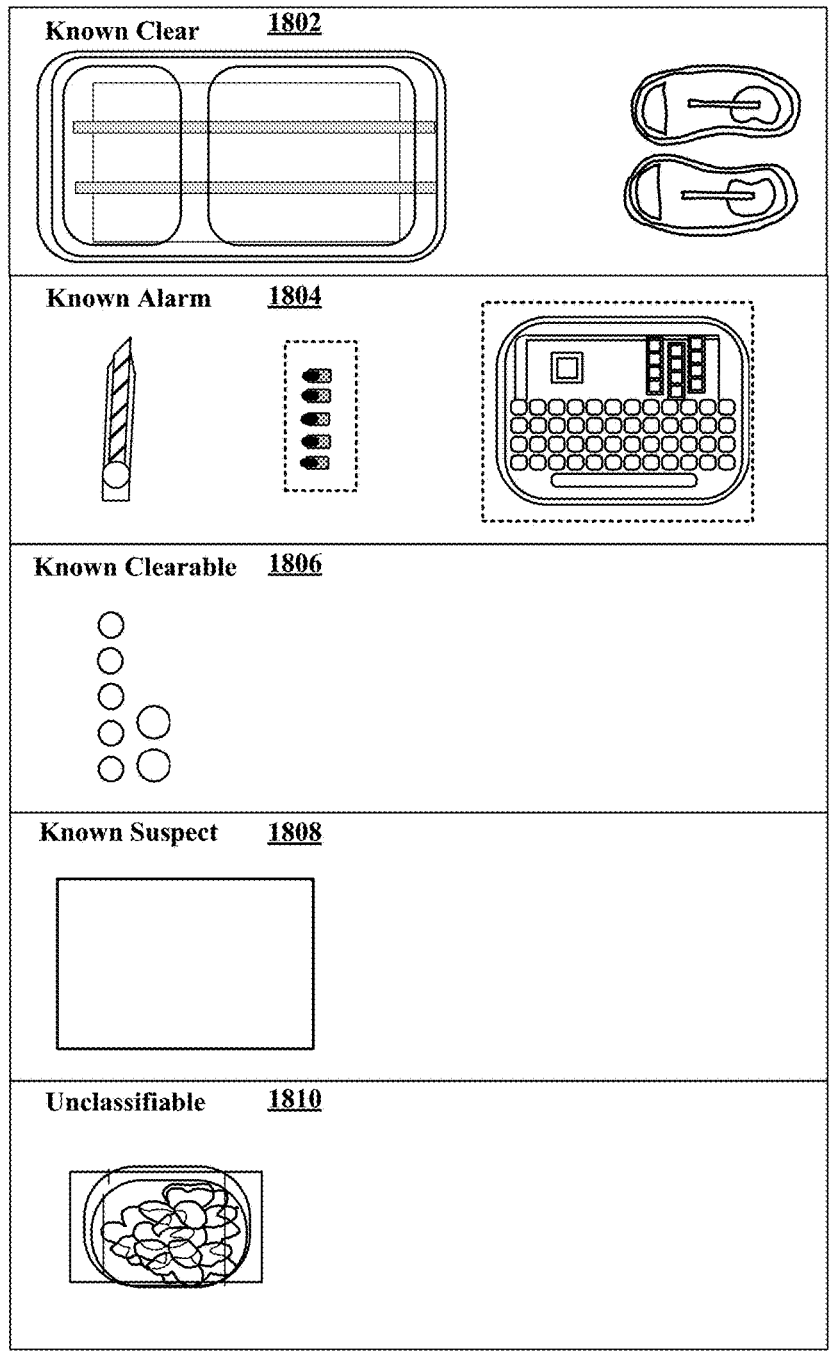
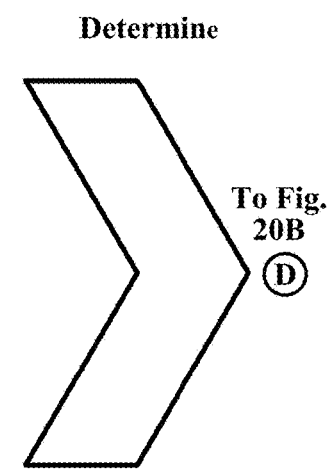
Fig. 20A

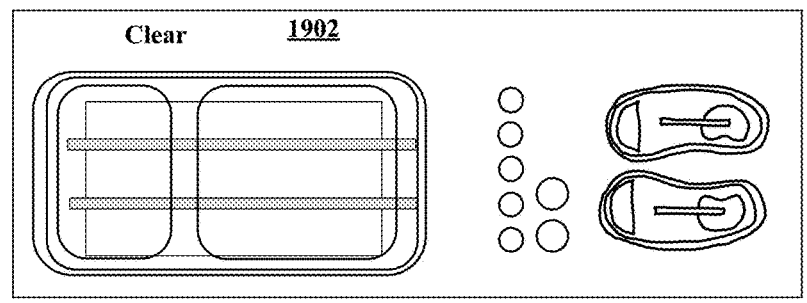
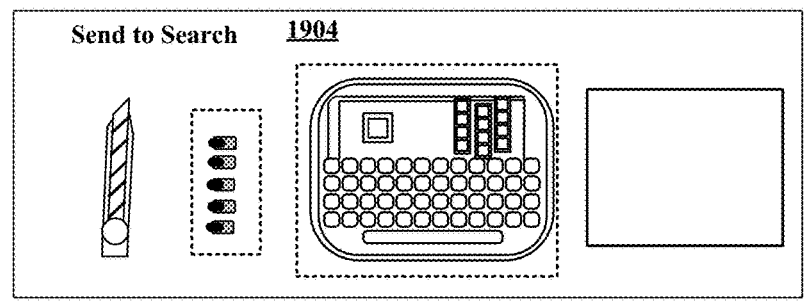
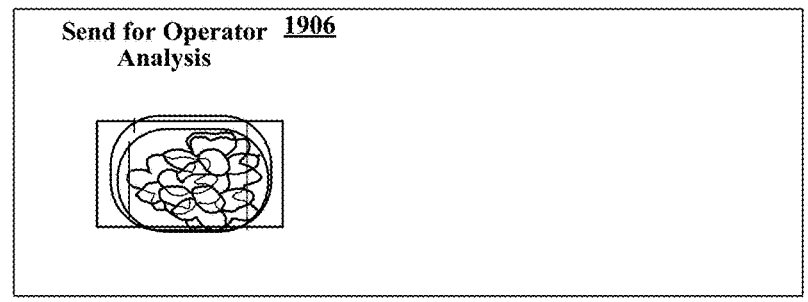
Fig. 20B

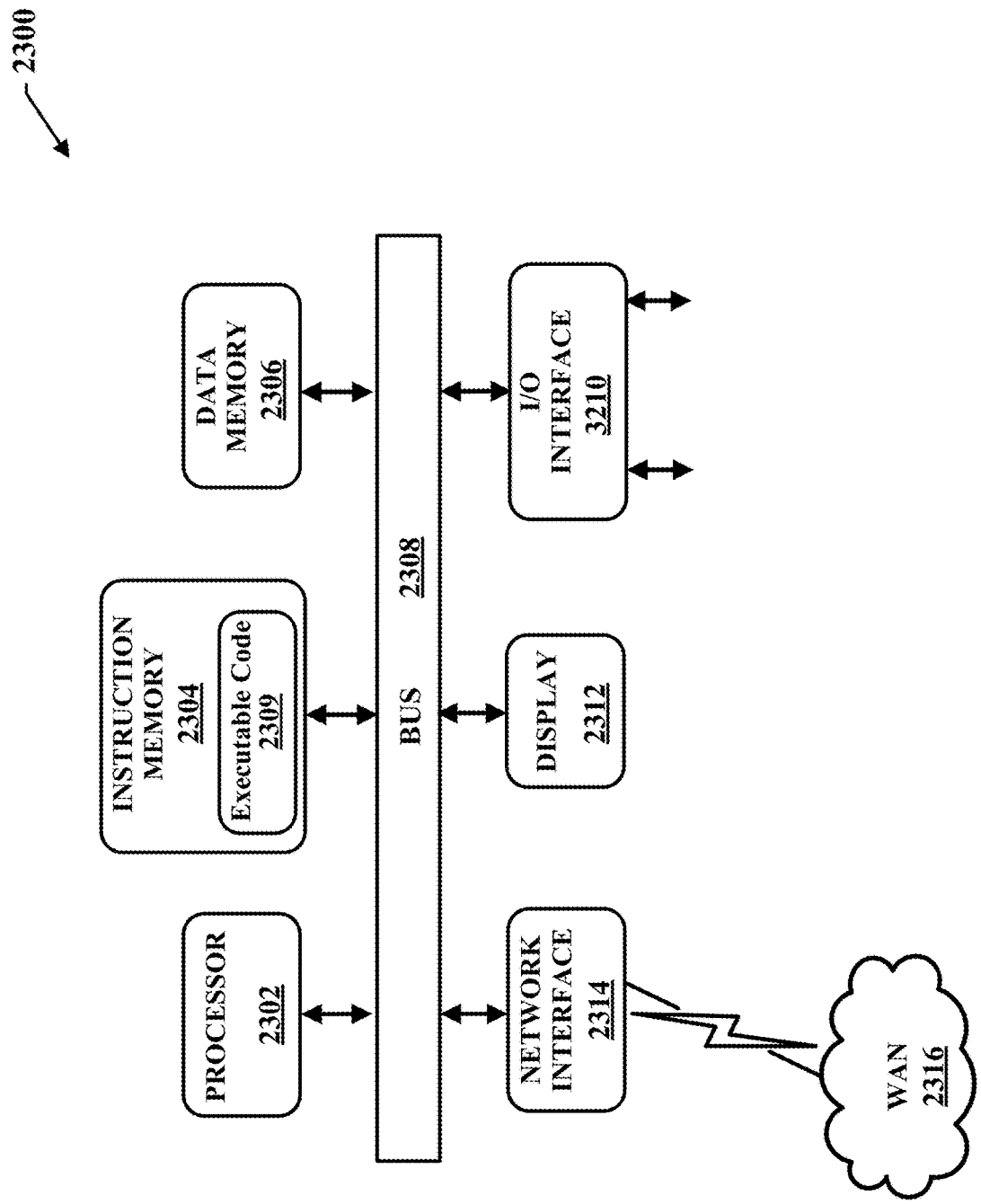

DIGITAL UNPACKING OF CT IMAGERY

CROSS-REFERENCE TO RELATED APPLICATIONS

This application is a divisional of U.S. patent application Ser. No. 17/499,537, filed Oct. 12, 2021, entitled "Digital Unpacking of CT Imagery," which claims the benefit of U.S. Provisional Patent Application No. 63/160,450, filed Mar. 12, 2021, entitled "Digital Unpacking of CT Imagery," both of which are hereby incorporated by reference in their entireties.

STATEMENT OF GOVERNMENT INTEREST

The present invention was made by employees of the United States Department of Homeland Security in the performance of their official duties. The U.S. Government has certain rights in this invention.

FIELD

Embodiments disclosed herein generally relate to electromagnetic (EM) scanning.

BACKGROUND

In various systems for electromagnetic (EM) scanning of containers for potential threat items, e.g., airport EM baggage scanning systems, an EM scanning equipment sends an operator a visible image of the EM scan of the entire container, accompanied by a request to the operator to identify which, if any, among the content items requires further action, e.g., manual inspection. In various of such systems, the operator draws a bounding box around each content item requiring further attention. Baggage items, though, can contain visually obstructive distributions, e.g., stacking and bunching, of many different kinds of items. This can make the operator task of mentally separating the item images from one another and determining, for each, whether it's an image of a threat item, a benign item, or an unknown item, time and labor intensive. Further, upon operator reception of a stream of baggage items, cumulative time and labor of separating and adjudicating their content images can result in operator errors.

SUMMARY

Systems are disclosed and an example can include a computer-based system for adjudicating object images in a computed tomography (CT) scan images of item containers, including a processor, and a tangible, non-volatile memory coupled to the processor and storing processor-executable instructions for the processor to: receive an image data, the image data being a CT scan of the container item, perform a separation process on the image data to obtain object images, perform a classification process on the object images between being in a threat item image class, a benign item image class, and a non-adjudicable threat image class; and communicate to a graphical user interface (GUI), as subject images, object images classified as non-adjudicable image class, the GUI being associated with an operator workstation. The processor executable instructions include instruction for the processor to generate and display on the GUI prompts for operator inputs regarding the subject images, and based at least in part on the operator inputs, identify the object type of the subject image, and based at least in part on the object type of the subject image, identify a threat level of the subject image, and update the classification process, based at least in part on the object type of the subject image and the threat level of the object image.

Methods are disclosed and an example can include receiving a CT scan image of an item container, including object images, classifying the object images between adjudicable threat level object images and unknown threat level object images. The example can include, responsive to a result of the classifying including an unknown threat level object image, displaying on a display of a graphical user interface (GUI) of an operator, as a subject image, an unknown threat level object image, together with a prompt for the operator to enter, via the GUI, a particular information regarding the subject image. The example can include based at least in part on the operator entered information, identifying the object type of the subject image, and based at least in part on the object type of the subject image, identifying the threat level of the subject image. The example can include updating the classifying, based at least in part on the object type of the subject image and the threat level of the object image.

Other methods are disclosed and an example can include receiving a CT scan image of an item container, digitally unpacking the object images, to obtain a plurality of unpacked object images, classifying by a first threat level classifier the unpacked object images, results from the first threat level classifier including first classifier known clear, first classifier known alarm, first classifier known clearable, first classifier known suspect, and first classifier unclassifiable. The example can further include classifying by a second threat level classifier the unpacked object images, results from the second threat level classifier including second classifier known clear, second classifier known alarm, second classifier known clearable, second classifier known suspect, and second classifier unclassifiable, conferring between the results from the first level threat level classifier and the second level threat level classifier, based on a result of the conferring, re-assigning the threat levels.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

FIG. 20A and FIG. 20B show an example determination of security outcome, utilizing preceding processes in digital unpacking, removal of identified object images, and computer-based directed query of operators for resolving unknowns, in accordance with various embodiments.

FIG. 23 illustrates, in schematic form, a computing system on which aspects of the present disclosure can be practiced.

DETAILED DESCRIPTION

Figure 1:
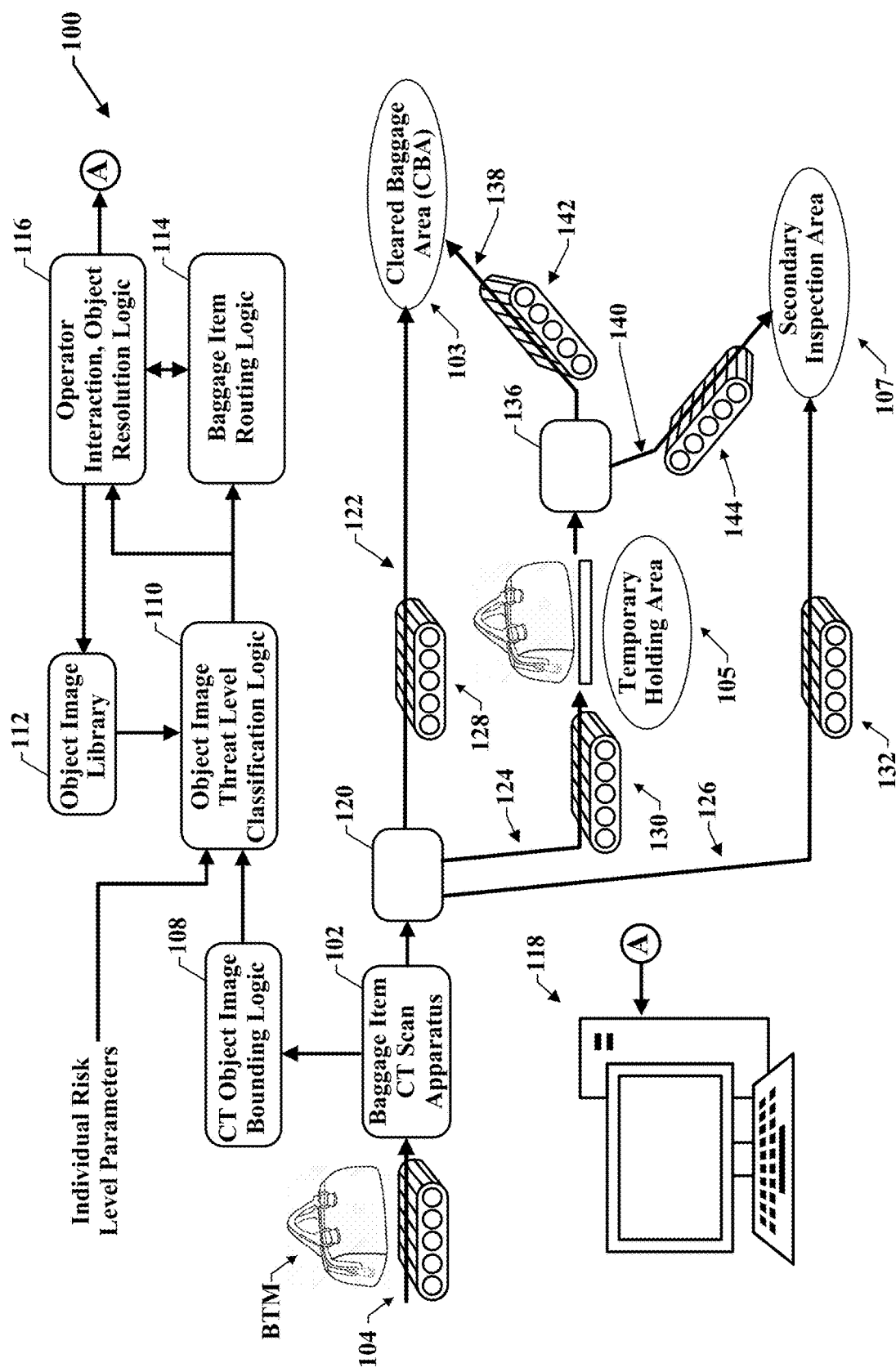
FIG. 1 illustrates an example environment for systems and methods for computer tomography (CT) scanning of containers, providing digital unpacking, object threat level classification, computer directed query to resolve unknowns, and run-time updates in accordance with various embodiments.

In the drawings, like reference numerals designate identical or corresponding parts throughout the several views. The drawings are generally not drawn to scale unless specified otherwise or illustrating schematic structures or flowcharts. As used herein, the words "a," "an" and the like generally carry a meaning of "one or more," unless stated otherwise.

One or more embodiments apply various computer-directed processes for operator interaction and query, to efficiently resolve threat classification of object images not classifiable by a current state of threat classifier system. In various embodiments, systems and methods can include inherent updating with each resolution of an object image that, for example, due to not yet being classifiable by the system, invoked the computer-directed, query prompting of operators to obtain information for resolution. Features include, but are not limited to, automatic incremental updating, e.g., of classification algorithms or a library of objects, utilizing information obtained for the resolution.

One or more embodiments can provide, without limitation, various features for reduction of operator time and labor in resolving unclassifiable object images. Such features include, but are not limited to communicating to operators, in response to ATR or other classifiers identifying one or more unclassifiable object images within a baggage item CT scan image, an uncluttered, reduced content version of the image. Systems and methods according to an embodiment can, for example, communicate to the operators a simplified version of the CT scan in which the unclassifiable object image is detected. Among such features is removing from the scan image sent to the operators, object images for which the threats category has already been determined, to an acceptable confidence level. Example features can remove object images categorized as benign objects. Such images can be distracting to the operators, and there may no statistically justifiable basis for expending time and labor inspecting what has already been inspected, and classified with acceptable confidence, as benign. Similarly, features can remove object images categorized as threat objects. Such images can be even more distracting to the operators, and security actions and precautions have already been instituted. Such embodiments can provide additional adaptiveness, for example, by including context object images, to provide operators with reference points to quickly find the one or more indeterminable threat category object images.

Systems and methods according to an embodiment can also provide pre-identified object boundaries, and can illuminate the object boundaries, for example, on the operator's display screen. Features can include, in response to detecting a CT scan image having one or more object images of indeterminable threat category, communicating to the operators display a context providing image. Features can also include, for example, communicating to the operators, with the context providing image, an image of the one or more indeterminable threat category object images identified in the original scan of the entire baggage item. Further features can include a GUI feature through which the operator can elicit a brightening of the image boundary of the indeterminable threat category object image. An example among such features, as described in more detail in later sections, can include the operator hovering the computer cursor over the object image, e.g., for more than a particular duration. The duration can be referred to as a hover trigger duration. The computer in response, can highlight, e.g., change the intensity or coloration or both, of the object images' boundary.

Description includes references to airport facilities and operations, as airports are an example environment in which various embodiments according to this disclosure can be practiced. However, airport facilities are not intended as any limitation as to environments in which embodiments in accordance with this disclosure can be practiced.

An example airport environment can include a baggage item CT scanner, e.g., which may be positioned, for example, in an access controlled area to prevent unauthorized contact or proximity to the equipment. Conveyance of baggage items to the CT scanner can be provided, for example, by a belt conveyor, e.g., from a loading area. The CT scanner may include an internal conveyance positioning mechanism to maneuver baggage items to a scan position. The environment can include a threat level classifier, for example, an automatic threat recognition (ATR) logic. The threat level classifier can be configured to receive CT scan image, apply a boundary detection process to separate individual object images, and apply an object image threat level classifier, or a plurality of different object image threat level classifiers. The object image threat level classifiers may be applied in combination with one or more object image type classifiers. Object image type classifiers can include one or more Q-class object image classifiers, "Q" being an integer, which may have different values for different ones of such classifiers. In an embodiment, object image threat level classification process may not include, at least in a discrete sense, object type classifiers. For example, in an embodiment, an object image threat level classifier or threat level categorization logic can be included than can classify, for example, a shotput as a threat item, without generating an explicit identifier of the object being a shotput. Such a classifier may classify based on a plurality of factors, some of which may be unrelated to physical features of the objects. It will therefore be understood that systems and methods in accordance with one or more embodiments can be implemented and practiced without including an object type classifier.

An example embodiment can include a switchable conveyor that, for example, in correspondence to presence or absence of an alarm or equivalent from an object image threat level classifier, can route a baggage item the CT scanner to an appropriate one among a set of different potential destinations. One such destination can be loading area for loading the baggage item, for example, onto an aircraft. Another of such destinations can be a manual inspection area, e.g., for baggage items detected, according to threshold confidence levels, as including certain kinds of threat items.

Features and benefits provided by various embodiments include providing to operators, through operator workstations, de-cluttered operators baggage item scan images, from which all resolved threat level object images may have been digitally removed. Secondary benefits of this example feature can include, but are not limited to, reduced time and labor load on the operators. In one or more embodiments features can include providing the operators with convenient guidance, via, e.g., by providing context images by which CT scan images can be de-cluttered, while still retaining helpful context, e.g., adjacent, or overlapping object images.

FIG. 1 illustrates an example system environment 100 for processes of CT scanning of containers, e.g., baggage items, featuring object threat-level classification and, in accordance with various embodiments, further includes, without limitation, processes of computer directed interactive query resolution of unknowns, directed interactive validations, and run-time updates as described in more detail in later sections of this disclosure. The system 100 can include a CT scan apparatus 102, which can receive baggage items, such as the example BTM, from CT scan input conveyor 104. The system can include a switchable conveyor from the CT scan apparatus, to switchable deliver the baggage item BTM to a cleared baggage area 103, a temporary holding area 105, or manual inspection area 107 the latter also being referred to as a "secondary screening area" 107. Control and operation of the switchable conveyor system is described in more detail in the following paragraphs. The system 100 can include, in association with the CT scan apparatus 102, a CT object image bounding logic 108, an object image threat level classification logic 110, and an object library 112. In an embodiment the system 100 can include a baggage item routing logic 114, an operator interaction and object resolution logic 116. The system 100 can include an operator workstation 118, and a first conveyor switch 120, which can select, under the control of the baggage item routing logic 114, among first path 122 to the cleared baggage area 103, second path 124 to the temporary holding area 105, and third path 126 to the secondary screening area 107. The system 100 can include a first conveyor apparatus 128 for implementing the first path 122, a second conveyor apparatus 130 for implementing the second path 124, and a third conveyor apparatus 132 for implementing the third path 126. The system 100 includes a second conveyor switch 136, controlled by the baggage item routing logic 114, for selecting the routing of baggage items from the temporary holding area 105, between a first exit path 138 to the cleared baggage area 103, and a second exit path 140 to the secondary screening area 107. A first exit path conveyor 142 can implement the first exit path 138 and a second exit path conveyor 144 can implement the second exit path 140.

Figure 2:
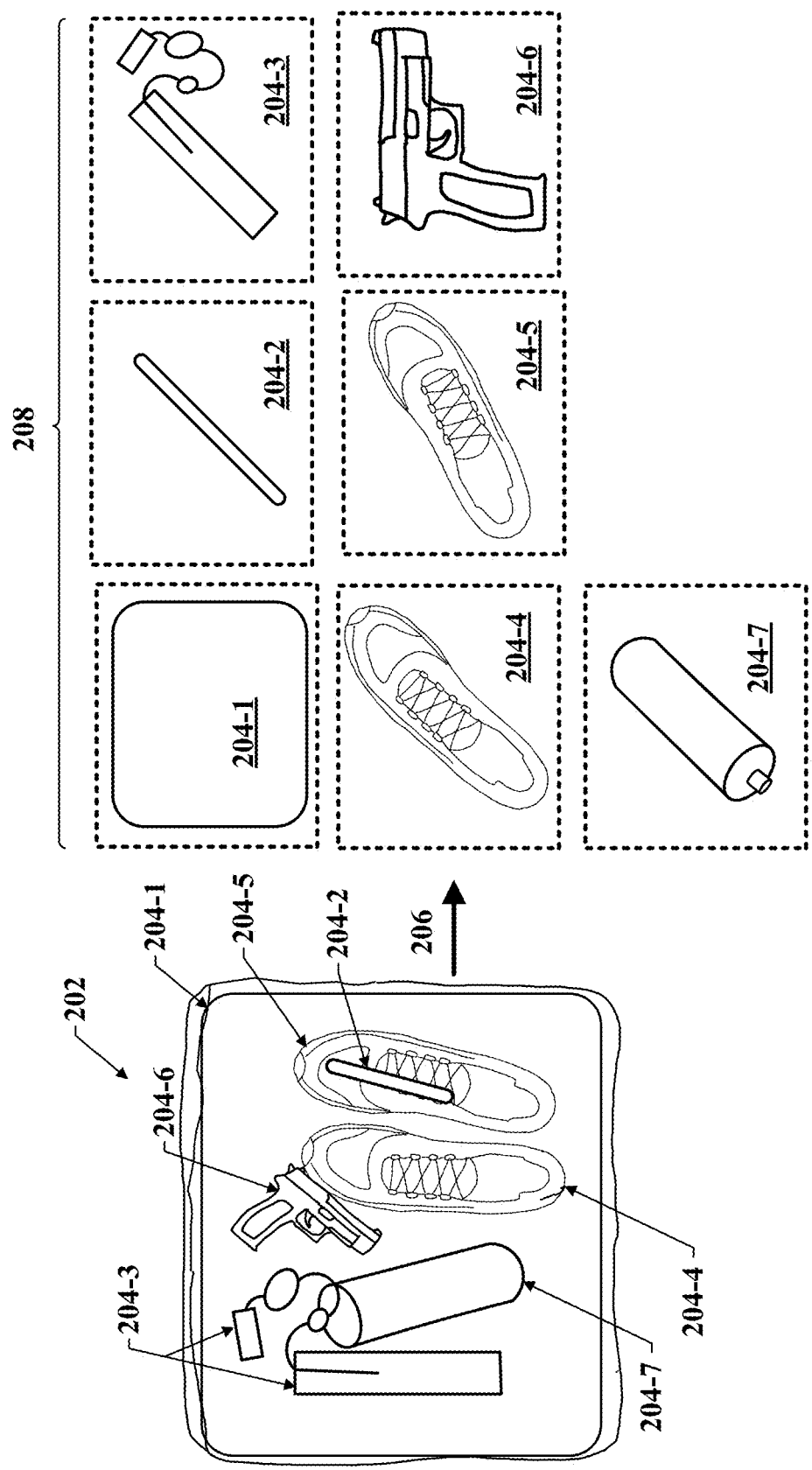
FIG. 2 illustrates a CT scan image of a baggage item, and example separated object images in a process in digital unpacking, and automatic operator interactive resolution, in accordance with various embodiments.

FIG. 2 illustrates a computer tomography (CT) scan image 202 of a baggage item, 204-1 and example set of content item images, as output by a digital unpacking of the CT scan image, in a process in digital unpacking, removal, and operator interaction in accordance with various embodiments. For purposes of description, the content item images will be referred to as "object images." Also, for purposes of this disclosure, the structure of the baggage item can be considered a "baggage item."

Object images in the FIG. 2 example CT scan image comprise a first object image 204-1, which is a CT scan image of the baggage item, a second object image 204-2, which is a CT scan image of a knife, and a third object image 204-3, which is a CT image of an improvised explosive device. Also included in the scan image 202 is a fourth object image 204-4, and a fifth object image 204-5, and a sixth object image 204-6. The fourth object image 204-4 is a CT scan of a left shoe, and the fifth object image 204-5 is a CT scan of a right shoe. The sixth object image 204-6 is a CT scan image of a firearm, For purposes of description, the above-described example first, second, third, fourth, fifth, and sixth object images will be collectively referenced as "object images 204." In an embodiment, as represented by the individual graphic blocks at the rightward region of the figure, a computer-implemented object bounding and separation process 206 has identified the respective boundaries of and separated, i.e., unpacked the object images 204. It will be understood that "separation," as used herein in the context of "bounding and separation" process 206, and recitation of "separate" and "separating" in reference to same, is a definitional separation. The definitional separation can be but is not necessarily accompanied by corresponding changes in physical storage locations in which the object images are stored.

For purposes of description, the object bounding and separation process 206 will be assumed to not include classification of the respective unpacked object images 204, i.e., process 206 may not include classification of object type, e.g., firearm, shoe, aerosol can, and so forth, or of threat category.

Figure 3:
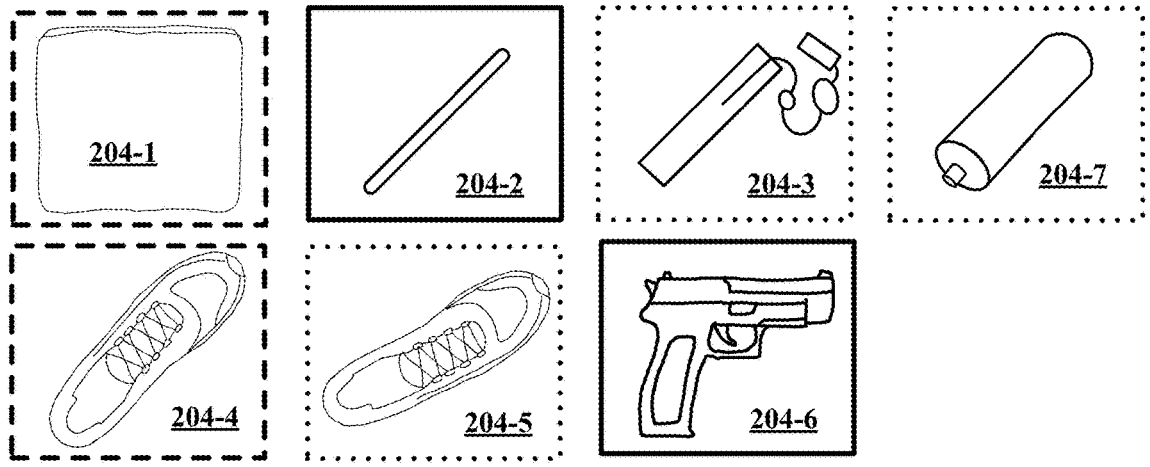
FIG. 3 shows an example classification output of an automatic threat recognition (ATR) process, as applied to a set of content item images output from a digital unpacking, using the example shown on FIG. 2, in digital unpacking, and computer-directed operator interactive query in accordance with various embodiments.

FIG. 3 shows a result of applying a computer-implemented threat level classification process to the unpacked object images 204. The threat level classification process classifies the unpacked object images 204 between being "benign" threat level objects, "threat" objects, and "unknown" threat level objects. The determined threat level classification is indicated by the form of the lines surrounds the unpacked object images 204. Object images 204 classified as threat object images are indicated by a solid line border. The object images classified as benign object images are indicated by a dashed line border, and object images classified as unknown threat level object images are indicated by a dotted line border. The legend is visible at the upper region of FIG. 3. As shown, the example object image threat level classifier classified the baggage item bag 204-1 and the left shoe 204-4 as benign object images, classified the knife 204-2 and the firearm 204-6 as threat object images. The example threat classifier classified the right shoe 204-5, the IED 204-3, and the aerosol can 204-7 as unknown threat level object images.

There can be various implementations of the threat classification logic. One example implementation can include classification as to object type, and separate classification as to threat level. In an embodiment, the latter classifier can be implemented, for example, as a lookup table. In an embodiment, the object image threat level classifier can classify based, at least in part on the type classification. Inputs to such a classifier can include, for example, type classifier results as to the object type for the object images. In an embodiment, type classifier results can include an affirmative result/not-affirmative result classification tag, where "affirmative" can mean the object image matched a library object, to within a requisite matching threshold, and not-affirmative can mean the object image did not match any library object. Inputs to the object image threat level classifier can also include risk tags for the individual(s) corresponding to the baggage item.

Referring to FIGS. 1 and 2, example logic for the computer-implemented classification process 200 can be provided by the object image boundaries logic 108 and the object image threat level classification logic 110.

Figure 4:
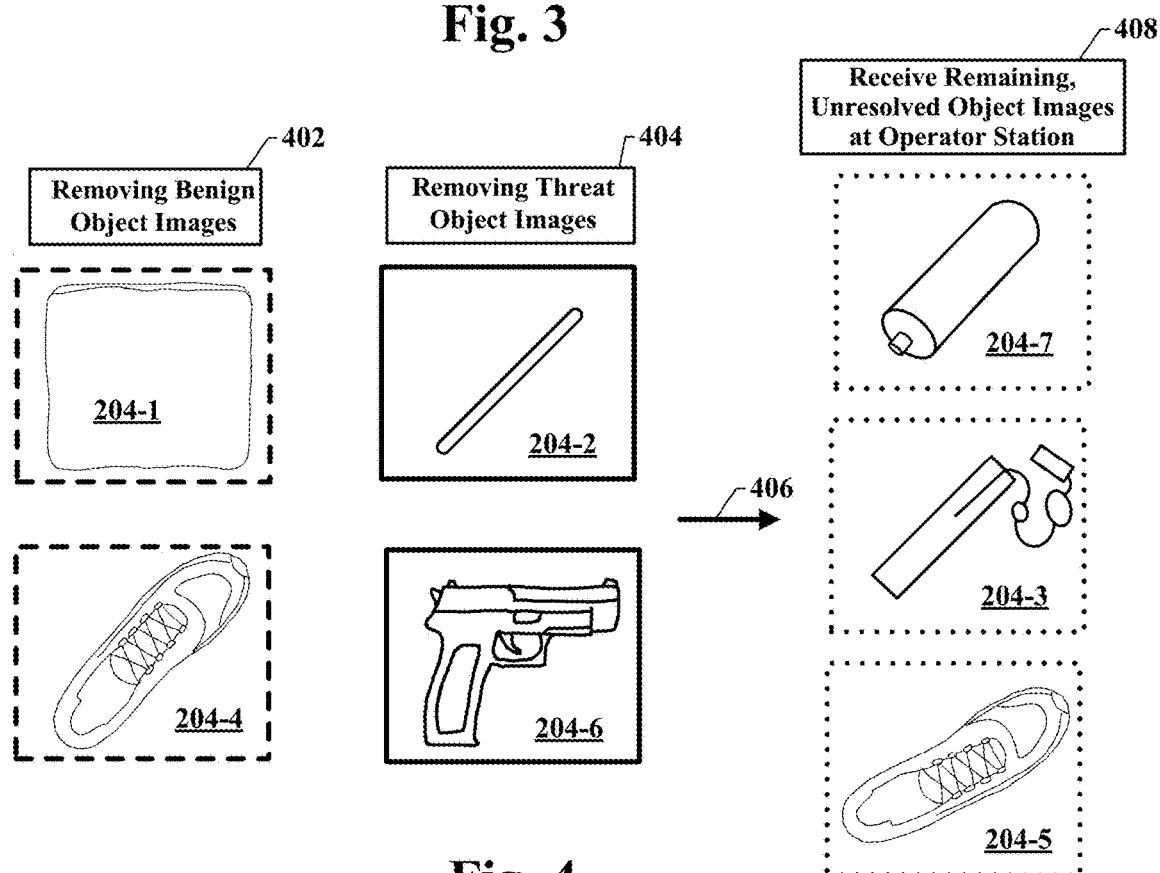
FIG. 4 shows an example operation in selective removal of unpacked item images from further consideration, using results of ATR classification of unpacked content item images, such as generated by FIG. 2, in a process in digital unpacking, removal, and operator interaction, in accordance with various embodiments.

FIG. 4 shows example operations in selective removal of unpacked item images from further consideration, using results of ATR classification as shown in FIG. 3, of unpacked scan image object images, such as generated by FIG. 3, in a process in digital unpacking, threat classification, and computer directed query resolution of unknown threat level object images, in accordance with various embodiments. Operations in the selective removal for computer directed query based resolution, can include removing 402 the benign object images, i.e., for this example, the baggage item object image 2041, and the left shoe object image 204-4. Operations can also include removing 406 the threat object images. In this example, these include the knife 204-2 and the firearm 204-6. The remaining object images 204 are object images 204 of unresolved threat level. In this example, unresolved are the right shoe object image 204-5, the IED object image 204-3, and the aerosol object image 204-7. Operations in the FIG. 4 selective removals as visible on FIG. 4 can also include communication, of the unresolved threat level object images to the operator workstation 118, e.g., over a computer network serving the FIG. 1 computer resources. Features of the above-described selective removals include, but are not limited to, providing to the operator workstation 118 a decluttered image of an item by digitally removing, from the CT scan image data, the object images that classify as threat object images and the object images that classify as benign object images.

Features can also include corresponding receiving 408 of such decluttered images by the operator workstation 118. For purposes of description, such images, while displayed on the GUI of the operator workstation, e.g., the FIG. 1 operator workstation 118, will be alternatively referred as "subject images."

Figure 5:
FIG. 5 shows an example of a system display of remaining images, and a user input field, in a graphical user interface (GUI) for operator interaction, in a process in digital unpacking, removal, and operator interaction, in accordance with various embodiments.

FIG. 5 shows an example of an operator display 500 of subject images 502, and proximal thereto, a computer-to-operator query presentation field 504, and an operator response button 506. According to an embodiment, a computer resource, e.g., the FIG. 1 computer operator interaction, object resolution logic 116, can display in the computer-to-operator query presentation field 504 the following query, while the subject unknown threat level object images are presented on the system display field: "Select All Possible Threat Items." In an application, such items can be automatically annotated and referred for secondary screening.

It will be understood that the scope of "possible," in the context of "Select All Possible Threat Items," may be environment-specific. In an embodiment, the operator display 500 can be implemented using an HTML, web-type configuration in which the user clicks on unresolved object images that the operator believes or judges as possible threat items, and can be designed such that the operator cursor on particular ones of the subject images 502 to select ones as being "possible threat items."

In implementation of the operator display 500, an interaction mechanism for selecting and not selecting subject images 502 as being "possible threat items" can be configured, for example, as click indications for the subject images 502. In an embodiment, click indication can include a first type of click indication on the display of the GUI for subject images 502 as being possible threat items, as opposed to a second type of click indication for subject images 52 not seen as possible threat items. The first type of click action can include, for example highlighting the display of the subject item, and the second type of click indication on the display of the GUI can include not highlighting the display of the subject image. In an implementation, the button functionality of the operator response button 506 can be, for example, a click field on which the operator can place the operator's cursor and click, or can be a touchpoint on a touchscreen.

It will be understood, however, that "button" and "click," in the context of the operator display 500 and its features and aspects described above, are logical functions. Physical implementation can be, but is not limited to conventional HTML interface configurations. For example, the operator response button 506 need not resemble a "button." An implementation of the operator response button 506 can include, for example, a right-click pull-down, which an operator can activate while the operator's cursor hovers above a particular one of the subject images 502. The pull-down can be configured to include, in its visible options list, a select" or equivalent. In a further example of such implementation, configuration can include assigning a left click, with the operator's cursor on the "select" option in the pull-down option list, as an operator action that designates the particular subject image 502 as a threat item.

In the above-example implementation of the operator display 500, the example computer-generated query appearing in the computer-to-operator query presentation field 504 was "Select All Possible Threat Items." In an example alternative implementation, the computer query could be "Click each Subject Image that You Can Identify a Threat Level, and Enter Your Response." In such implementation, a right-click or equivalent may activate a pull-down list, having options that include "Threat Item" and "Benign Item." In an embodiment, the options list can be configured with more detailed granularity. For example, options may include "Threat Item," "Benign Item," "Categorical Benign Item," and "Categorical Threat Item."

In an embodiment, the system, e.g., the FIG. 1 operator interaction, object resolution logic 116, can include a feature of communicating to the operator GUI, with the set of subject images, a data for displaying positions and arrangements of the subject images relative to positions and arrangements of context object images that appeared in the CT image with the subject images. Features can also include, responsive to the operator indicating a context request, displaying on the operator GUI the particular subject image together with the corresponding the context object images. The feature can also include highlighting the subject image's object image, in this example the image of the IED 204-3, to avoid being lost in its context. The context request feature can be implemented for example, by the operator hovering the cursor above the particular subject image for a time meeting a threshold, e.g., a context request threshold. Also, in one or more embodiments, a further feature can include at least one of the context object images not being among subject images. In other words, the context object images can include at least one object image that was logically removed, from the imaged displayed on the operator's GUI.

Figure 6A:
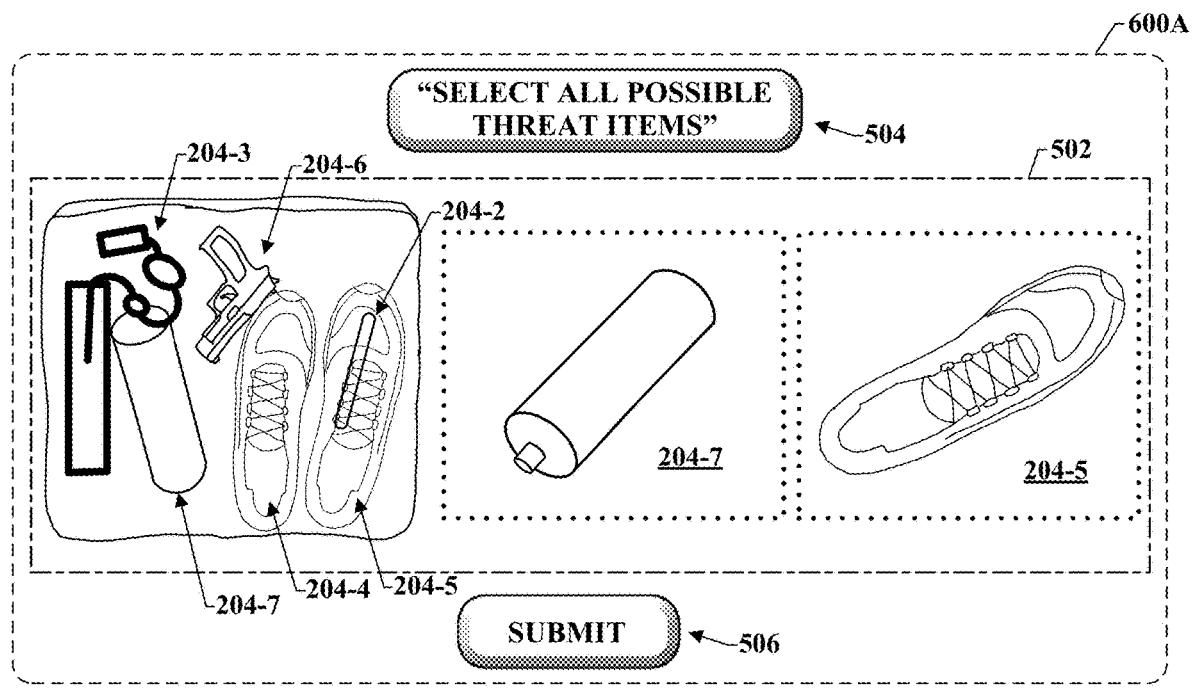
FIG. 6A shows an example further display on a system GUI for operator interaction for viewing a selected non-adjudicated item image in its original CT scan context, in accordance with various embodiments.
Figure 6B:
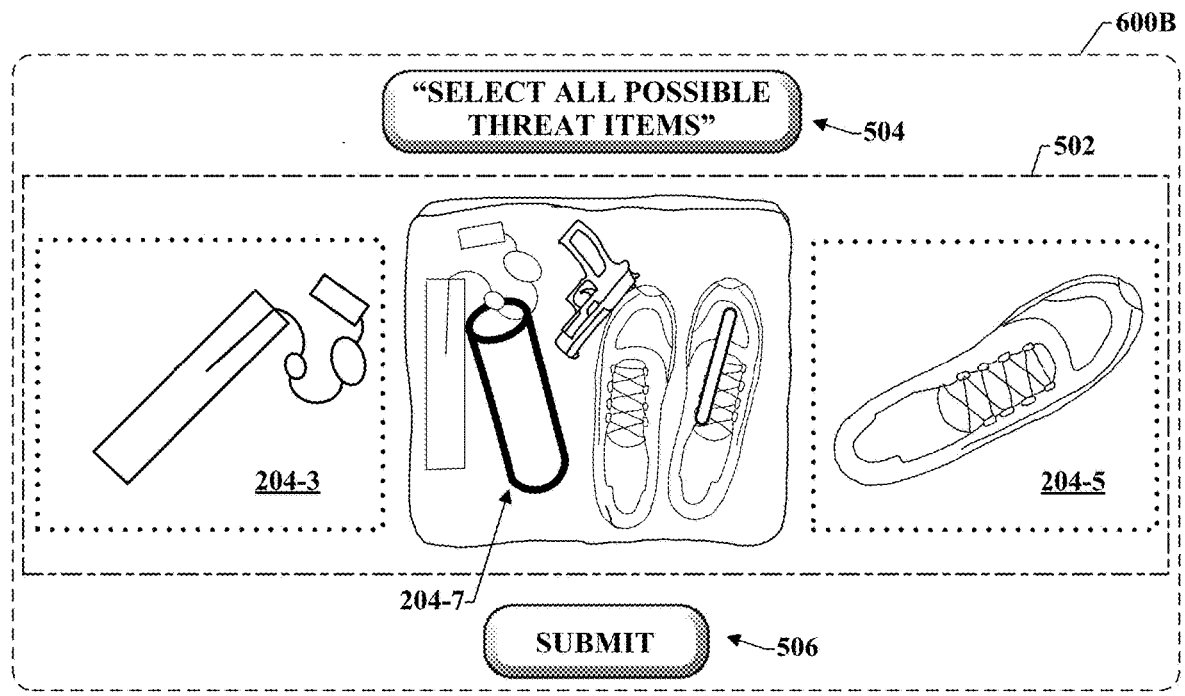
FIG. 6B shows another presentation of operator selection of another non-adjudicated object image in its original context.
Figure 6C:
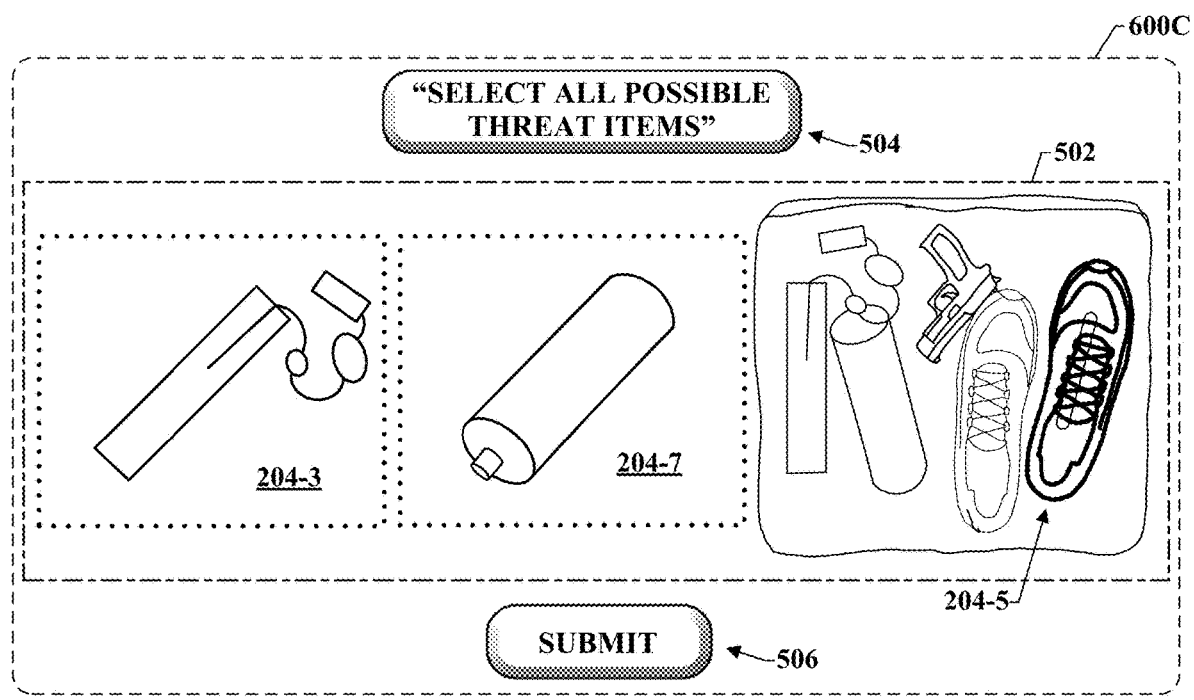
FIG. 6C shows operator selection of another non-adjudicated object image in its original context.

An example implementation of the above-described feature will be described in reference to FIGS. 6A, 6B, and 6C, in which FIG. 6A shows an example display on the operator GUI in which the operator has communicated the context request for the leftmost of the subject images. As described above, this may be performed, for example, by hovering the cursor over the leftmost subject image for a time exceeding the context request threshold. As visible, the result is the IED image 204-3 being visible in its original context, while being highlighted to above confusion. FIG. 6B shows operator GUI display resulting from operator selection, e.g., by hovering the cursor over the middle of the three subject images, and corresponding highlighting of the aerosol can 204-7, within its original context. FIG. 6C shows operator inputting a context request, selection the rightmost subject image, the right shoe 204-5, as another non-adjudicated object image in its original context.

Figure 7:
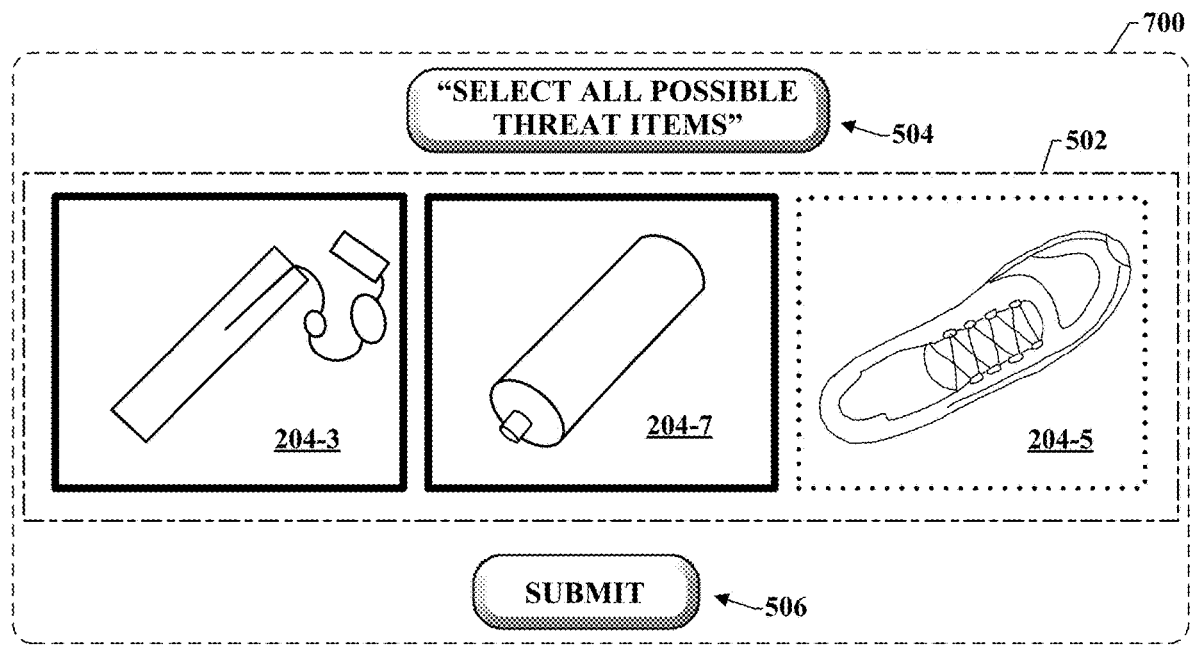
FIG. 7 shows operator GUI aspects in computer-based, automatic directed query validation of operator input regarding an object image of undetermined item type, in accordance with various embodiments.

FIG. 7 shows a configuration of an operator GUI display, after the operator has identified two of the three subject images as "threat objects," as the computer requested of the operator via the computer generated query presentation field 504. As shown, the border of the two selected subject images has changed from the dotted line indication of having an unknown threat level to the solid line border indication of being a threat object. It will be understood that the above-described visible indication of object image threat level, i.e., a threat-level indicative border style in accordance with the legend appearing in the upper region of FIG. 3, is only an example. Alternative indications include, but are not limited to, a different array of border styles, and include annotation other than borders.

Referring to FIG. 7, object image 204-5, in this example a right shoe, which can be referenced as subject image 204-5 while displayed on the operator display, remains indicated as an object image of unknown threat level. In an embodiment, one or more identification processes may be applied for such items, i.e., items that were unknown by the system threat classifiers, but not identified as a threat by the operator. Such identification processes can include the computer querying the operator to identify the items. Implementation can include subject images remaining after the operator identification and designation described in reference to FIGS. 6A-6C, being automatically designated as subject images of unknown identity. For purposes of description, after an operator identification and designation as described in reference to FIGS. 6A-6C, the now-designated subject images of benign threat can be referred to as a "set of subject images of unknown identity." If there are no subject images of benign threat the set of subject images of unknown identity is a null set.

Figure 8:
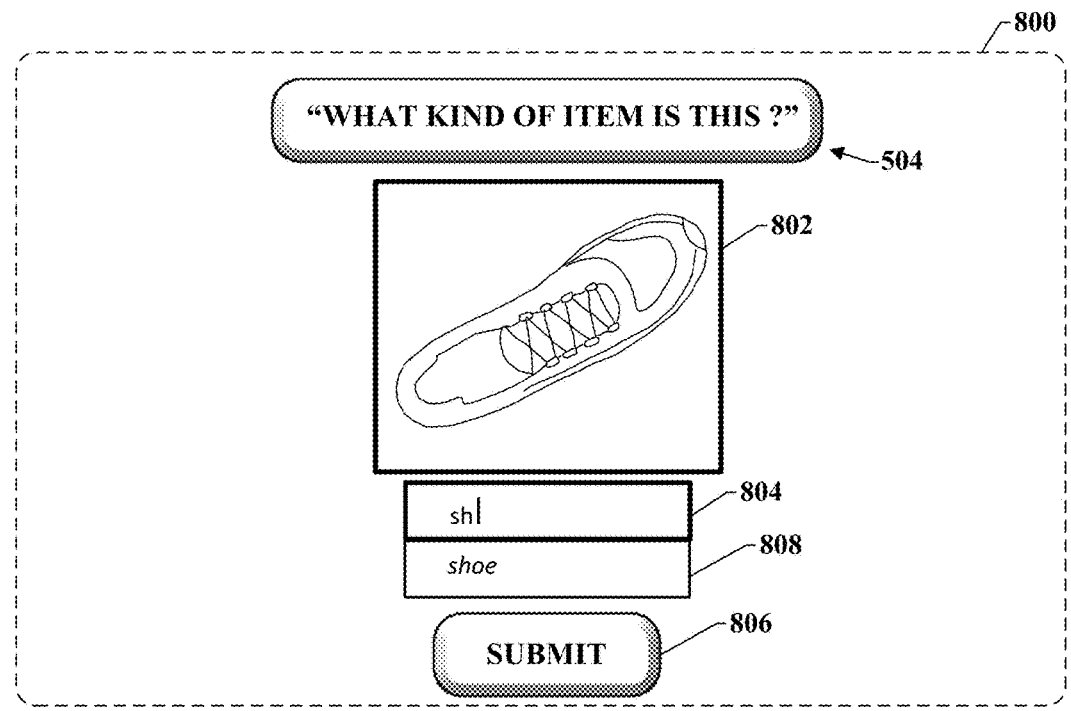
FIG. 8 shows operator GUI aspects in computer-based, automatic directed query validation of operator input regarding an object image of undetermined item type, in accordance with various embodiments.

FIG. 8 shows operator display, e.g., on a GUI display configuration 800, aspects in computer directed query validation of operator input regarding an object image within the set of subject images of unknown identity. In an embodiment, a computer directed query validation as illustrated in FIG. 8 can be initiated in response to the set of subject images of unknown identity not being a null set. The query can include displaying on the computer query field 504 of the operator display, as a query image 802, a subject image among the set of subject images of unknown identity. In the example visible on FIG. 8, the query image is subject image 204-5, the right shoe of the example introduced in reference to FIG. 2. In an embodiment, operations in the instant example computer directed query validation can include displaying, e.g., in the GUI display configuration 800, e.g., under or adjacent the query image 802, a text entry field 804. Operations can also include a computer-generated query or prompt, e.g., in the computer query presentation field 504, for the operator to enter an operator indication in the text entry field 804 a type descriptor for the object indicated by the query image. Responsive to an operator indication, e.g., via the submit button 804, that entry of the type descriptor is complete, operations include, based at least in part on the type descriptor that the operator entered in the text entry field 804, a computer resource such as the FIG. 1 operator interaction, object resolution logic 116, assigning the operator entered type descriptor as a type of the subject image displayed as the query image.

Referring to FIG. 8, in an embodiment, computer directed query validation of operator input regarding an object image within the set of subject images of unknown identity can also include displaying, e.g., in a candidate type field 808 that is proximal to the text entry field 804, a sequentially updated candidate type, using a sequential update corresponding to operator sequential entry of text characters into the text entry field 804. In an implementation, responsive to a user entry to the GUI indicating a candidate type is correct, e.g., by touching or clicking on the submit button 806, operations can include setting the operator's entry of the type as being complete and as being the candidate type.

In an embodiment, the system can provide a computer-directed validation of operator inputs for subject images of unknown type by querying the operator with confirmatory questions using known items of the same type as a baseline. An example can include displaying on the GUI of the operator workstation a query image, an image of a library object, and at least one other object image among the subject images. The image of the library object can be from an object library, such as the FIG. 1 object image library 112. In an implementation, the library object can be of a type identical or similar to the operator-indicated type, e.g., the type entered in the process described above in reference to FIG. 8. In one or more embodiments, operations in validating through computer-directed querying with confirmatory questions, configured for confirmatory response can include request for operator confirmatory response, on the GUI of the operator workstation, between affirmative and not affirmative, as to matching between the library object and the operator-indicated type of the query image.

Figure 9A:
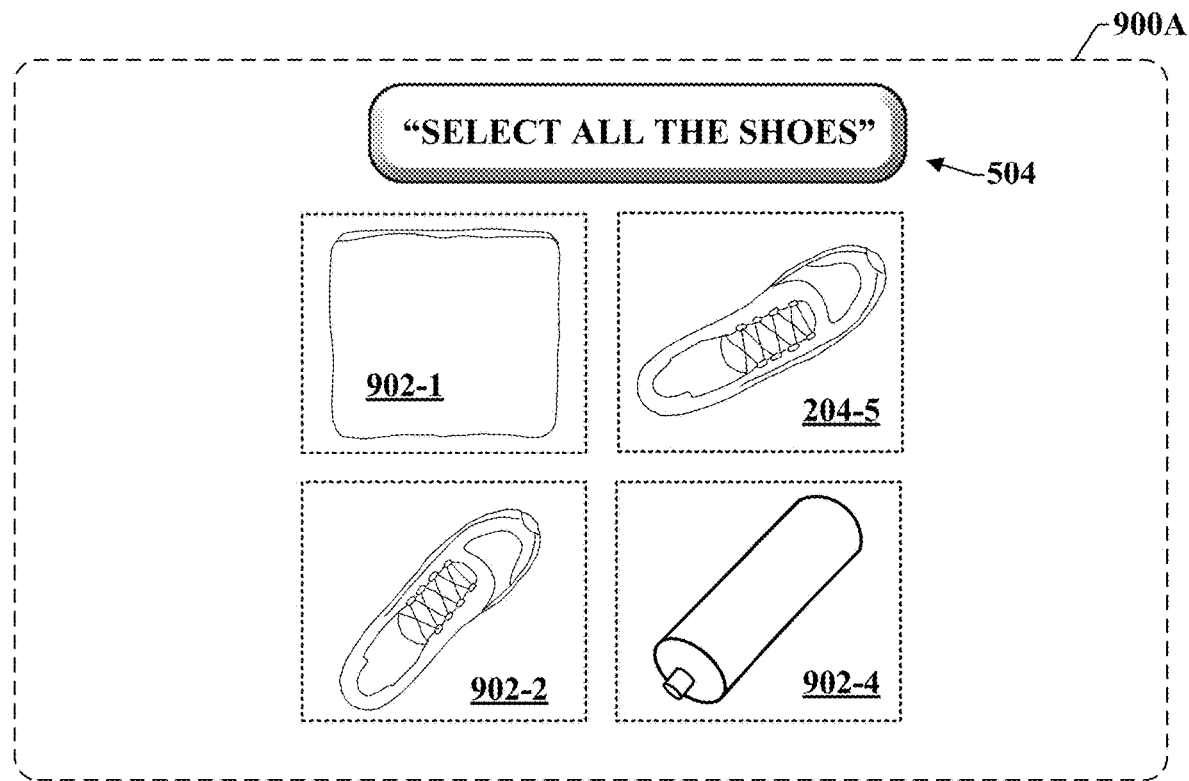
FIGS. 9A and 9B show operator display and GUI aspects in another example process in validating operator input regarding an object image of undetermined item type, in accordance with various embodiments.
Figure 9B:
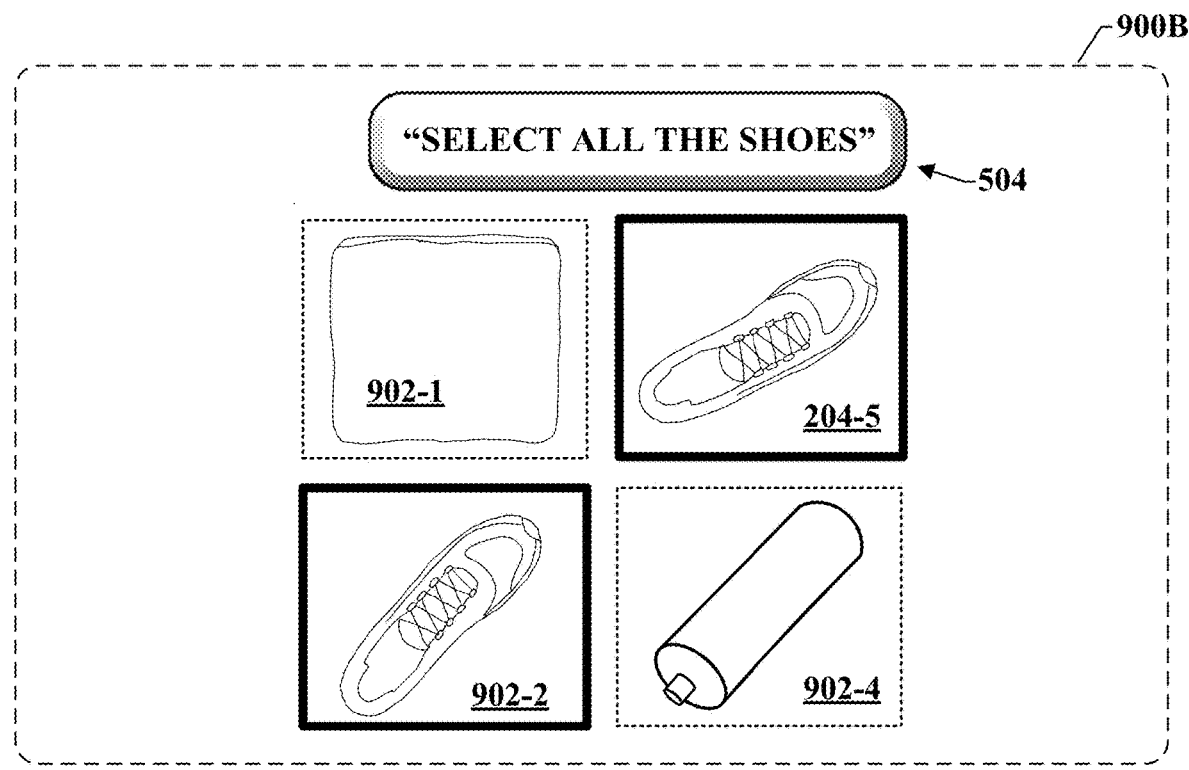

FIGS. 9A and 9B show an example configuration for the above-described querying the operator with confirmatory questions using known items of the same type as a baseline.

Figure 10:
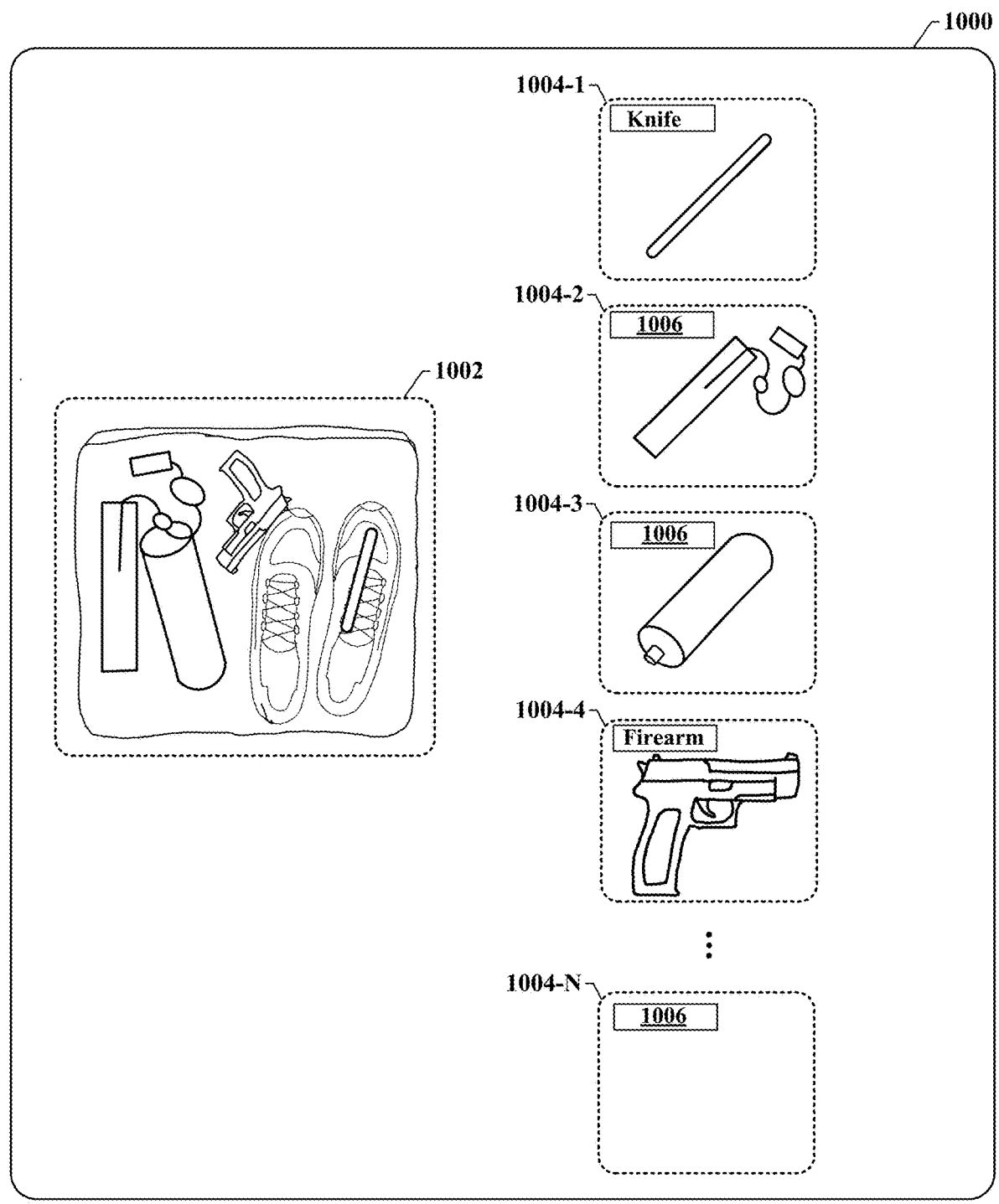
FIG. 10 shows an example configuration of a computer-generated secondary screening operator display for secondary screening to identify objects of undetermined item-type, and unresolved threat class.

FIG. 10 shows an example configuration of a computer-generated secondary screening operator display 1000 for secondary screening to identify objects images of undetermined item-type, and unresolved threat class. Referring to FIG. 10, example operations can include displaying, e.g., on a computer display viewable from the secondary inspection area 107, a secondary inspection display configuration 1000. The secondary display configuration 1000 can include a guidance image 1002, which can be a configuration of the received CT scan image for the baggage item, e.g., the FIG. 2 scan image 202. The secondary display configuration 1000 can also include, e.g., in a geometrically organized configuration for inspection convenience, object images of the CT scan image, which are shown in FIG. 10 as a first secondary inspection object image 1004-1, second secondary inspection image 1004-2, . . . , and so forth, through to and Nth secondary inspection image 1004-N, collectively "secondary inspection images 1004." In an embodiment, the secondary inspection images 1004 can include a type field 1006.

For purposes of a teaching example, the FIG. 10 visible secondary inspection images 1004 are the unpacked object images 204 described in reference to FIG. 2. In accordance with the type classification status shown in FIG. 3, secondary inspection images 1004 of known type, namely, threat object image types for this example, are the knife, which is the first secondary inspection image 1004-1, and the firearm, which is the fourth secondary inspection image 1004-4. FIG. 111A shows the object fields 1006 of these two object images populated accordingly.

Figure 11A:
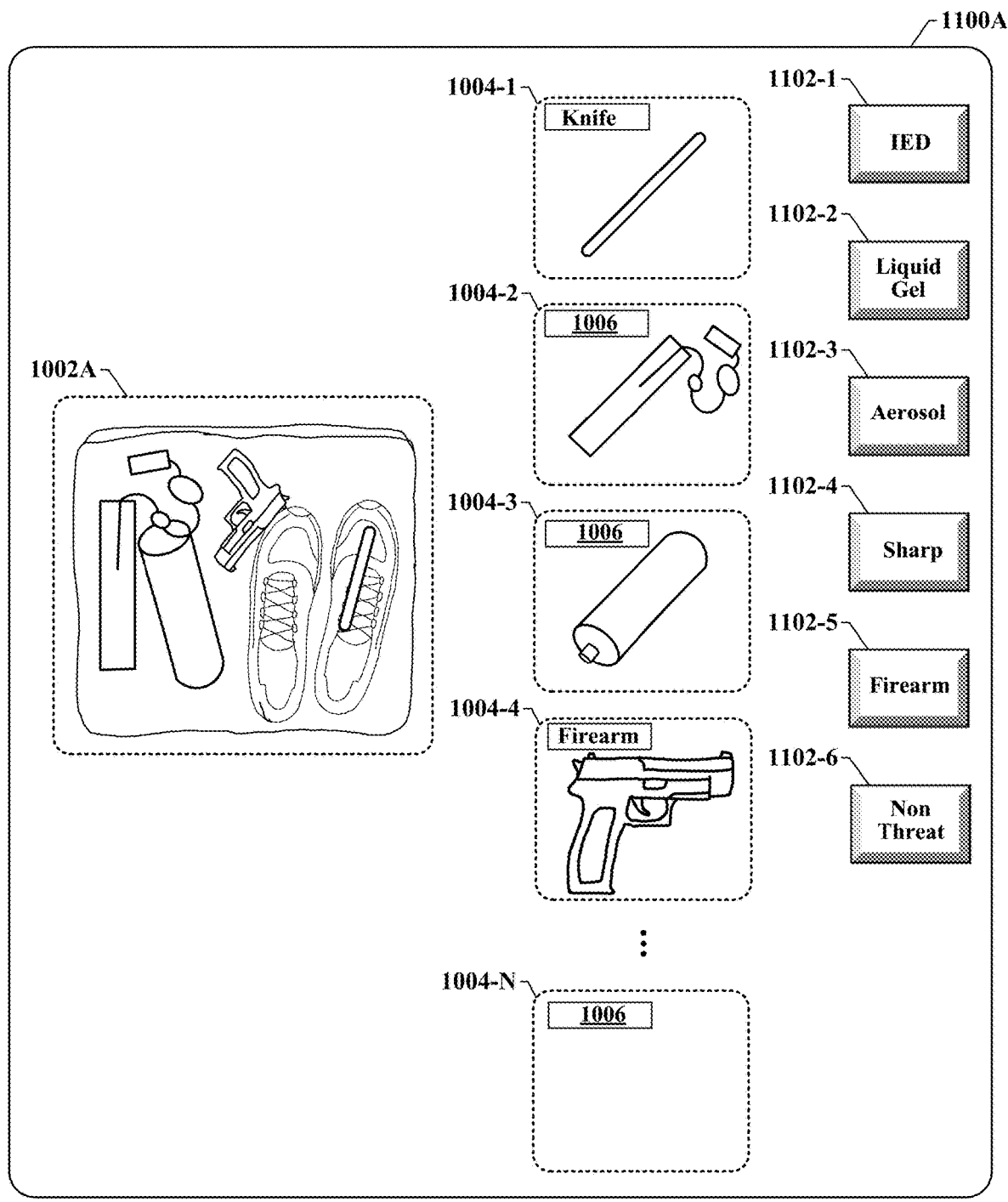
FIG. 11A, FIG. 11B, and FIG. 11C show a secondary screening display configuration, and illustrates via snapshot sequence, using computer prompts and secondary screening responses to same, resolution in accordance with various embodiments, as an aerosol can, of one example non-determined item-type, and unresolved threat class object image.
Figure 11B:
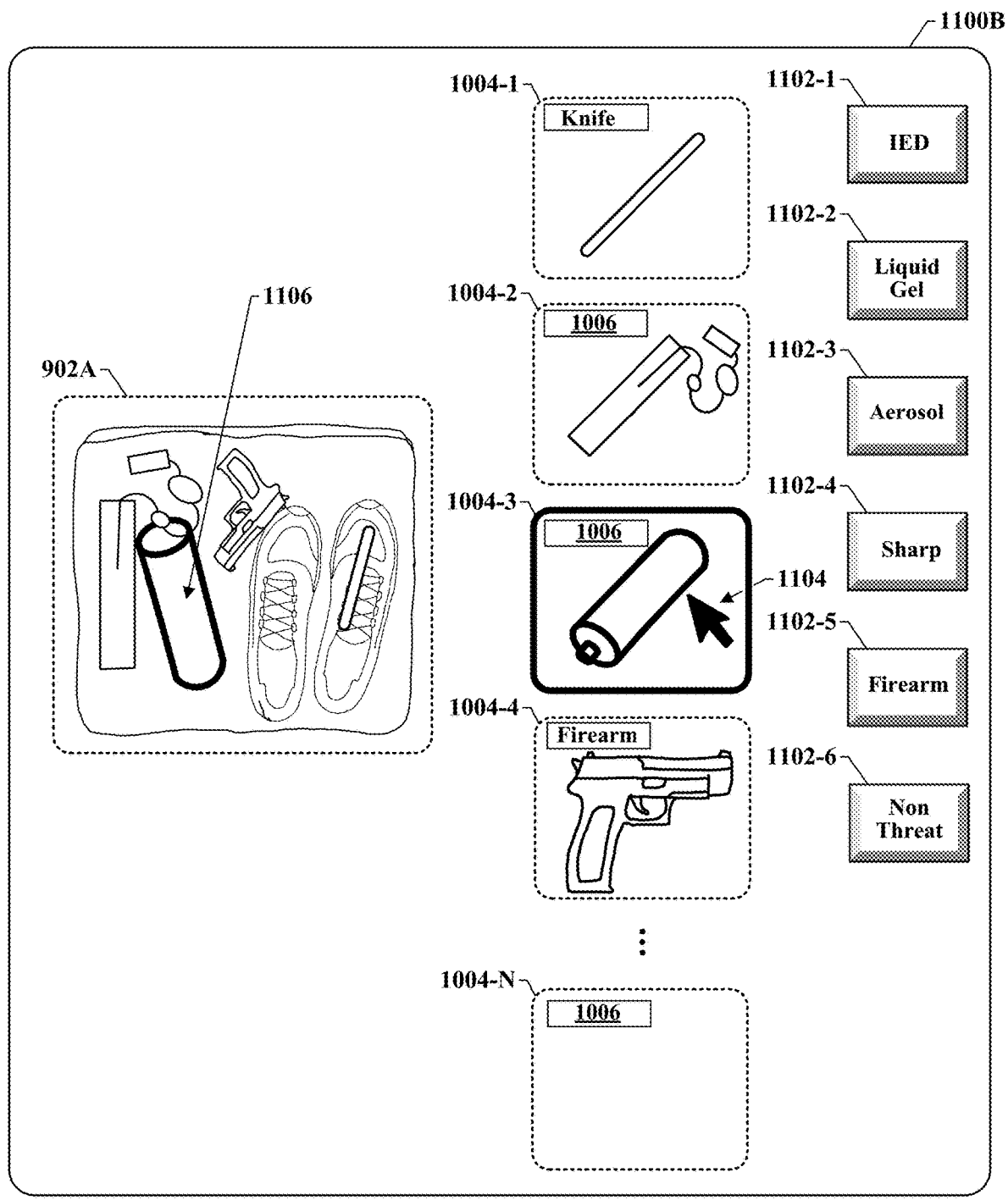
Figure 11C:
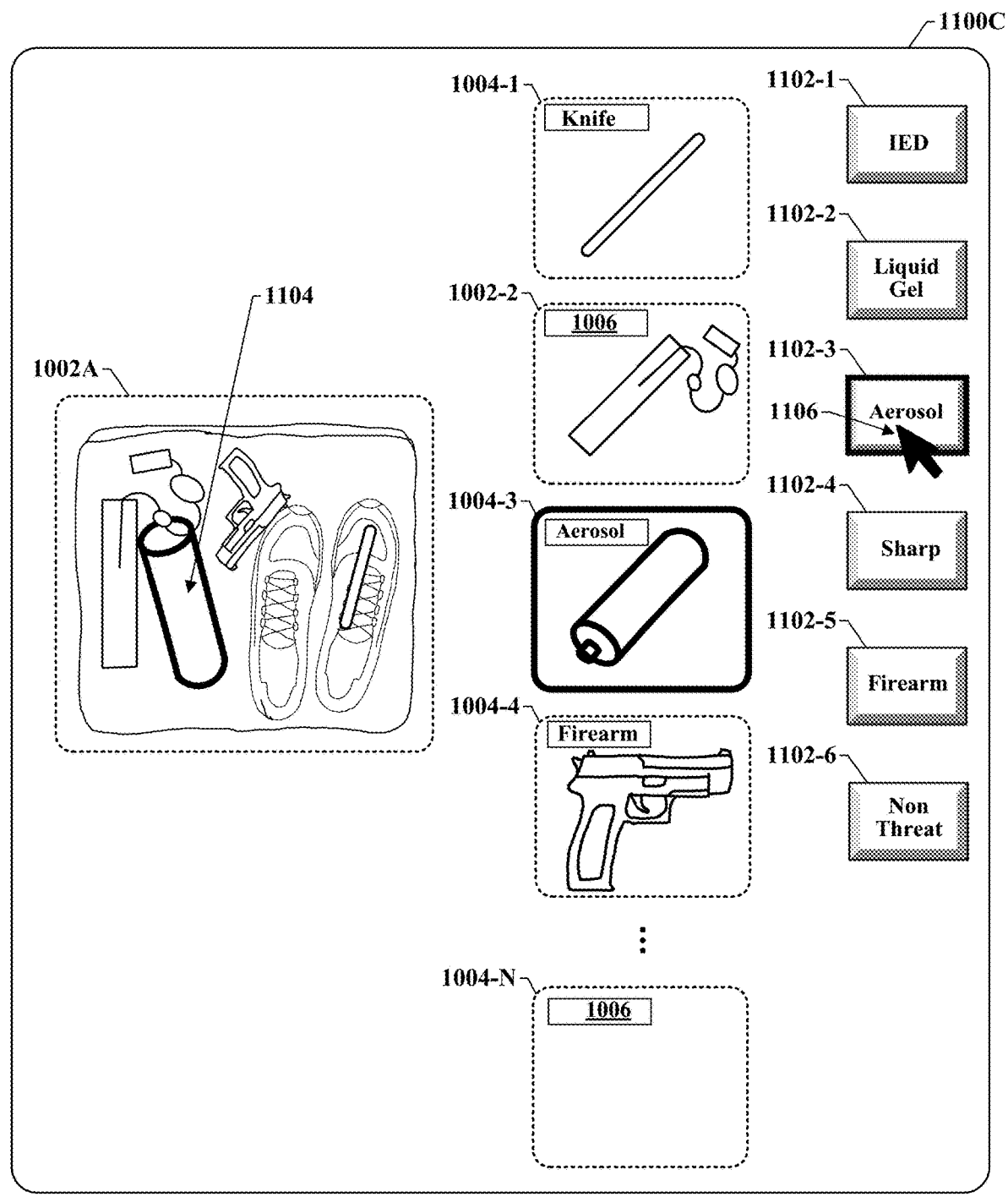

FIGS. 11A, 11B, and 11C show a secondary inspection display configuration, and illustrate via snapshot sequence, using computer prompts and secondary inspector responses to same, resolution in accordance with various embodiments, as an aerosol can, of one example non-determined item-type, and unresolved threat class object image. Referring to FIG. 11A, the secondary inspection display configuration is numbered as item number 1100A, to distinguish from subsequent FIGS. 11B and 11C snapshots. The FIG. 11B secondary inspection display configuration is numbered 1100B, and the FIG. 11C secondary inspection display configuration as 1100C.

The FIG. 11A secondary inspection display configuration 1100A includes the content of the FIG. 10 secondary inspection display configuration 1000, and can further include two or more GUI object image type buttons, or object image descriptor button, or both, and can include a benign or non-threatening object selection button. The specific example visible in FIG. 11A includes, as GUI object image type selection buttons, IED object image type selection button 1102-1, an aerosol object image type selection button 1102-3, and a firearm object image type selection button 1102-5. The FIG. 11A example also includes GUI object physical characteristics selection buttons, which include liquid gel characteristic selection button 1102-2 and sharp characteristic button 1102-4, and includes non-threat object type selection button 1102-6.

Features of the FIG. 11A secondary inspection display configuration 1100A include computer guidance, via a display of the CT scan image of the item container, e.g., of the baggage item, together with display of the unpacked object images, with known types being clearly marked by the image type field 1106, and a visible assortment of GUI selection buttons from which to quickly select. An implementation for entry of the object items can provide, for example, for the secondary inspector apply a mouse button selection, e.g., by clicking on the image, of one of the object images of unknown type, followed by clicking on one of the GUI selection buttons.

Referring to FIG. 11B, features of the secondary inspection display configuration 1100B can include, but are not limited to, provision for the secondary inspector to select one of the secondary inspection object images 1004, by positioning a mouse cursor 1104 the selected secondary inspection object image, which for purposes of teaching example is shown as the third secondary inspection object image 1004-3. As shown in FIG. 11B and as described above, the object is an aerosol can or container. In an embodiment, selection action by the secondary inspector can be a mouse click, or a mouse hover time exceeding a trigger duration, while the cursor hovers over the desired secondary inspection image, i.e., the third secondary inspection object image 1004-3. In one or more embodiments, system response to the secondary inspector above-described selection can include a system highlighting of the selected third secondary inspection object image 1004-3. FIG. 11B represents the highlighting by darker, thicker lines for the third secondary inspection object image 1004-3. In one or more embodiments, features can also include, without limitation, highlighting within the item container scan image 1002 of the object image selected by the secondary inspector. An example operation of this feature is represented in FIG. 11B by darker, thicker lines for the outline 1106 of the aerosol can image as it appears in the CT scan image 1002 with its context object images.

Referring to FIG. 11C. features of the secondary inspection display configuration 1100C can include, without limitation, provision for the secondary inspector to select to select an object type or object characteristic(s) to assign to the selected secondary inspection object images 1004. An example can include provision for the secondary inspector to position the mouse cursor 1104, or equivalent, over the appropriate one of the GUI selection buttons 1102 and, e.g., without limitation, either click or hover at said position for more than the hover trigger duration. click. In one or more embodiments, system response to the above-described secondary inspector selection of an object type or physical characteristic can include automatic, appropriate, populating of the object type field 1006. FIG. 11C shows such action by darker, thicker lines for the aerosol GUI selection button 1102-3, and by populating the object type field 1006 of the third secondary inspection object image 1004-3 with "aerosol."

Figure 12A:
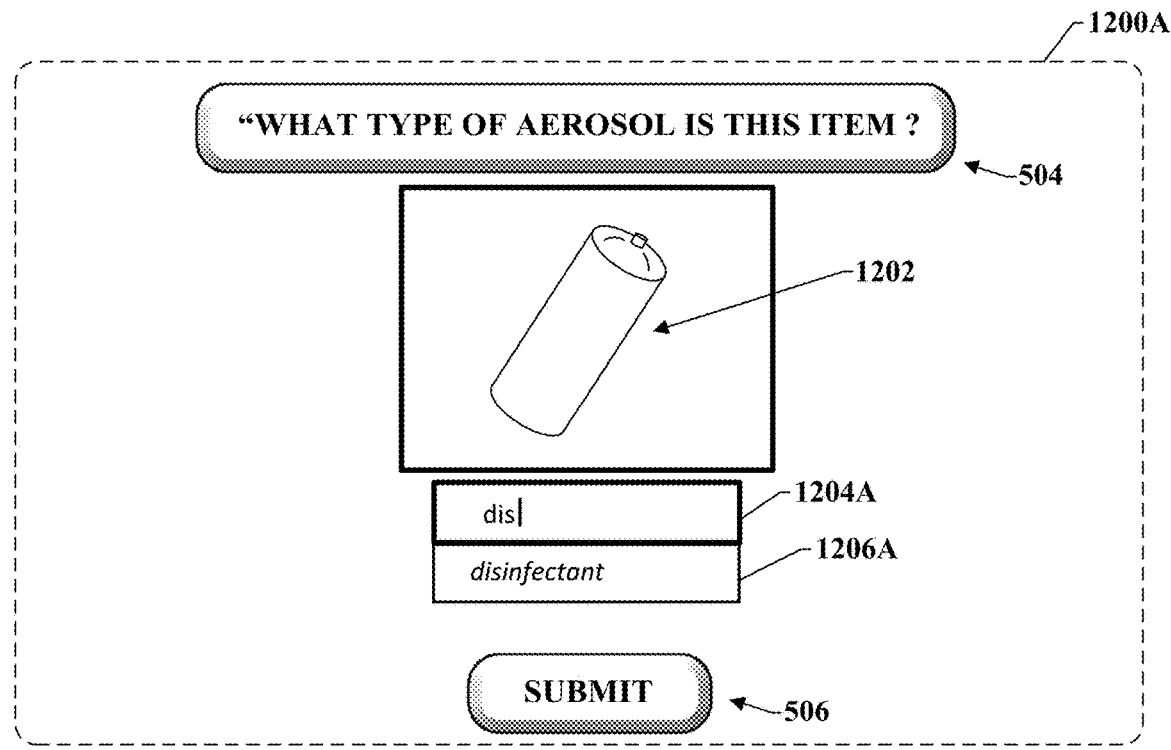
FIG. 12A and FIG. 12B show, as presented on an operator display, operations in a computer-directed query process for obtaining, in accordance with various embodiments, via drill-down focusing, further information on an object corresponding to the object image resolved using operations illustrated in FIGS. 11A through 11C.
Figure 12B:
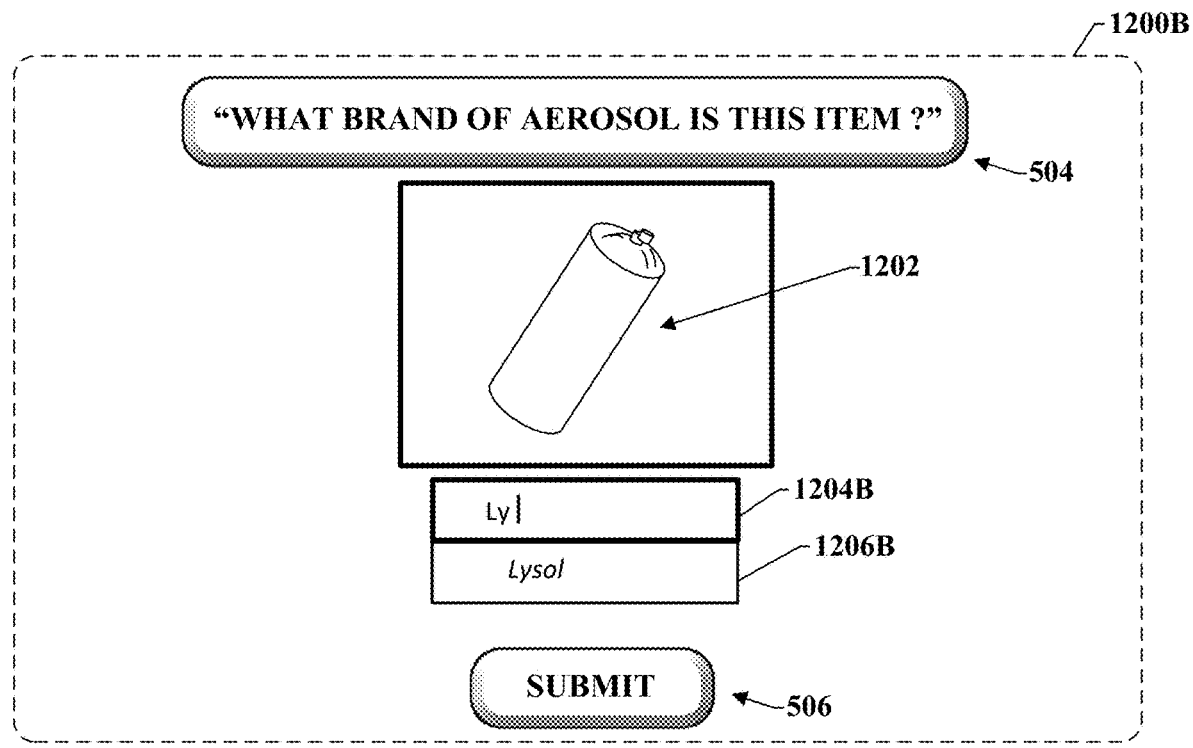

FIGS. 12A and 12B show, as presented on an operator display, operations in a computer-directed query process for obtaining, in accordance with various embodiments, via drill-down focusing, further information on an object corresponding to the object image resolved using operations illustrated in FIGS. 11A through 11C.

Referring to FIG. 12A, an implementation of the GUI display configuration 1200A, can include displaying, under or adjacent query image 1202, a text entry field 1204A, and displaying, in the query presentation field 504 of the GUI of the operator workstation, a computer-generated query or prompt, asking entry, in the text entry field 1204A, of a descriptor, or other operator indicator of an answer to the question "What Type of Aerosol Is this Item?" In an implementation the user, e.g., the secondary inspector, can click the "Submit" button 506 when the user believes e.g., is satisfied that the entry answers the computer query. In an embodiment, disincentives to entering information exceeding the scope of the computer query can be provided. One such incentive can be a candidate descriptor field 1206A, in combination with a processor-executable instructions for a programmable computer to generate, display, and sequentially update a candidate descriptor corresponding to operator sequential entry of text characters into the text entry field 1204A. Implementations can include provision for user indication of the candidate descriptor being appropriate.

FIG. 12B shows, via GUI display configuration 1200B, an implementation of a more detailed computer directed query that can include displaying, in the query presentation field 504, a computer-generated query or prompt, asking entry, in the text entry field 1204B, of a descriptor, or other operator indicator of an answer to the question "What Brand of Aerosol is this Item." Operator entry of the response can be via text entry field 1204B and candidate descriptor field 1206B as described above in reference to FIG. 12A.

Figure 13:
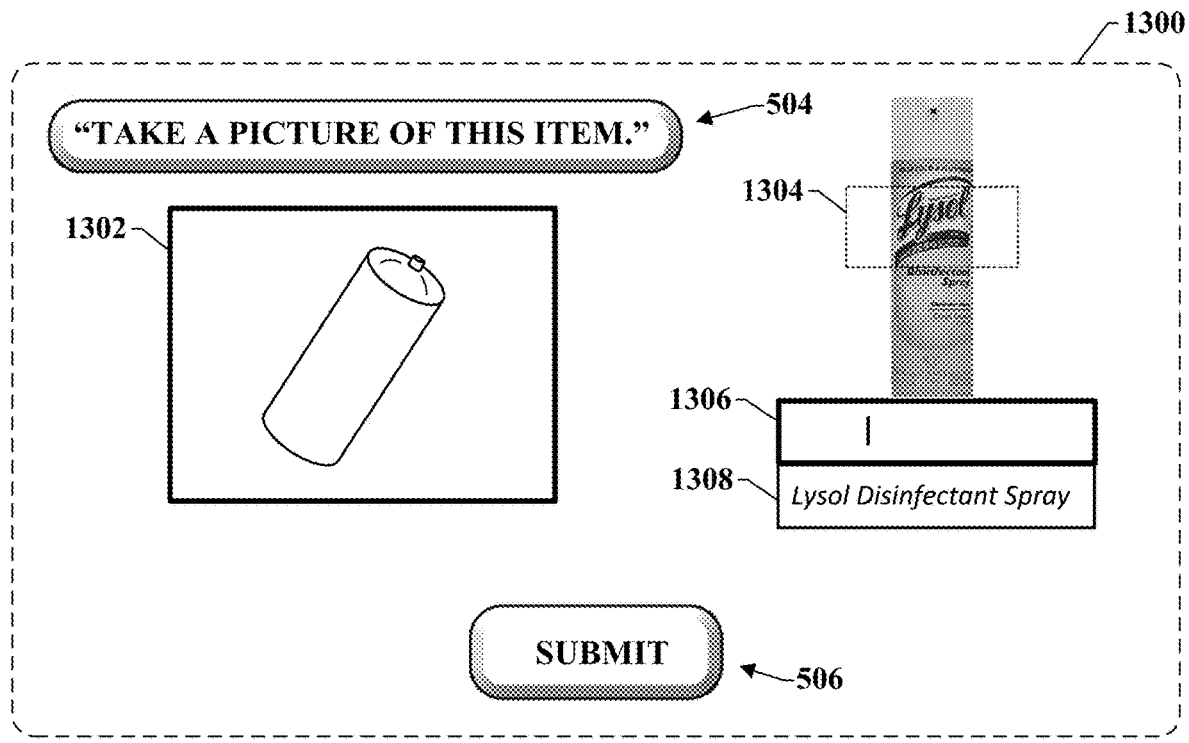
FIG. 13 shows a flow in a computer-based prompting an operator to capture camera images of the object of which the type was determined, for this example, by operations shown on FIGS. 11A-11C, and aspects of computer provision of guidance for operator entry of a textual description.

FIG. 13 shows a flow in a computer-based prompting an operator to capture camera images of the object of which the type was determined, for this example, by operations shown on FIGS. 11A-11C, and aspects of computer provision of guidance for operator entry of a textual description.

Figure 14:
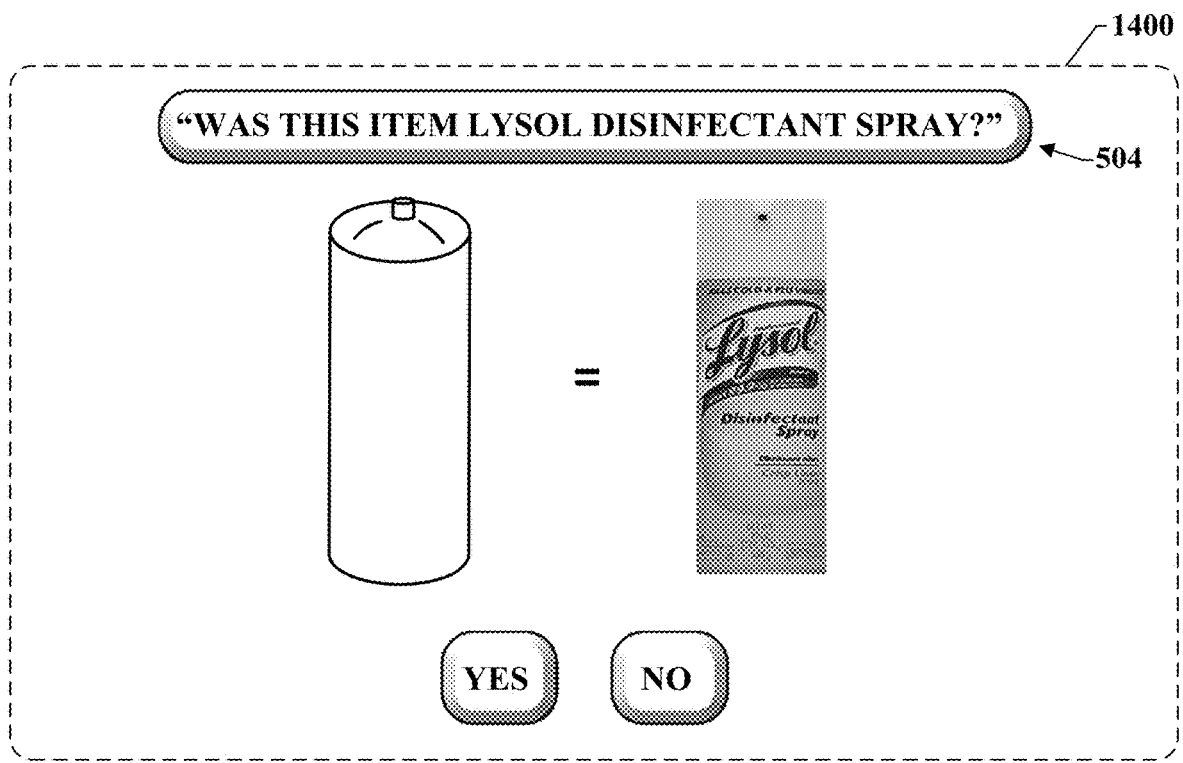
FIG. 14 shows aspects, on an example configuration of an operator GUI, and operations thereon computer-directed validating in accordance with one or more embodiments, including computer-presented prompts, and an example text entry field for user entry, and a corresponding display for guiding such entry.

FIG. 14 shows aspects, on an example configuration of an operator GUI, and operations thereon computer-directed validating in accordance with one or more embodiments, including computer-presented prompts, and an example text entry field for user entry, and a corresponding display for guiding such entry.

Figure 15:
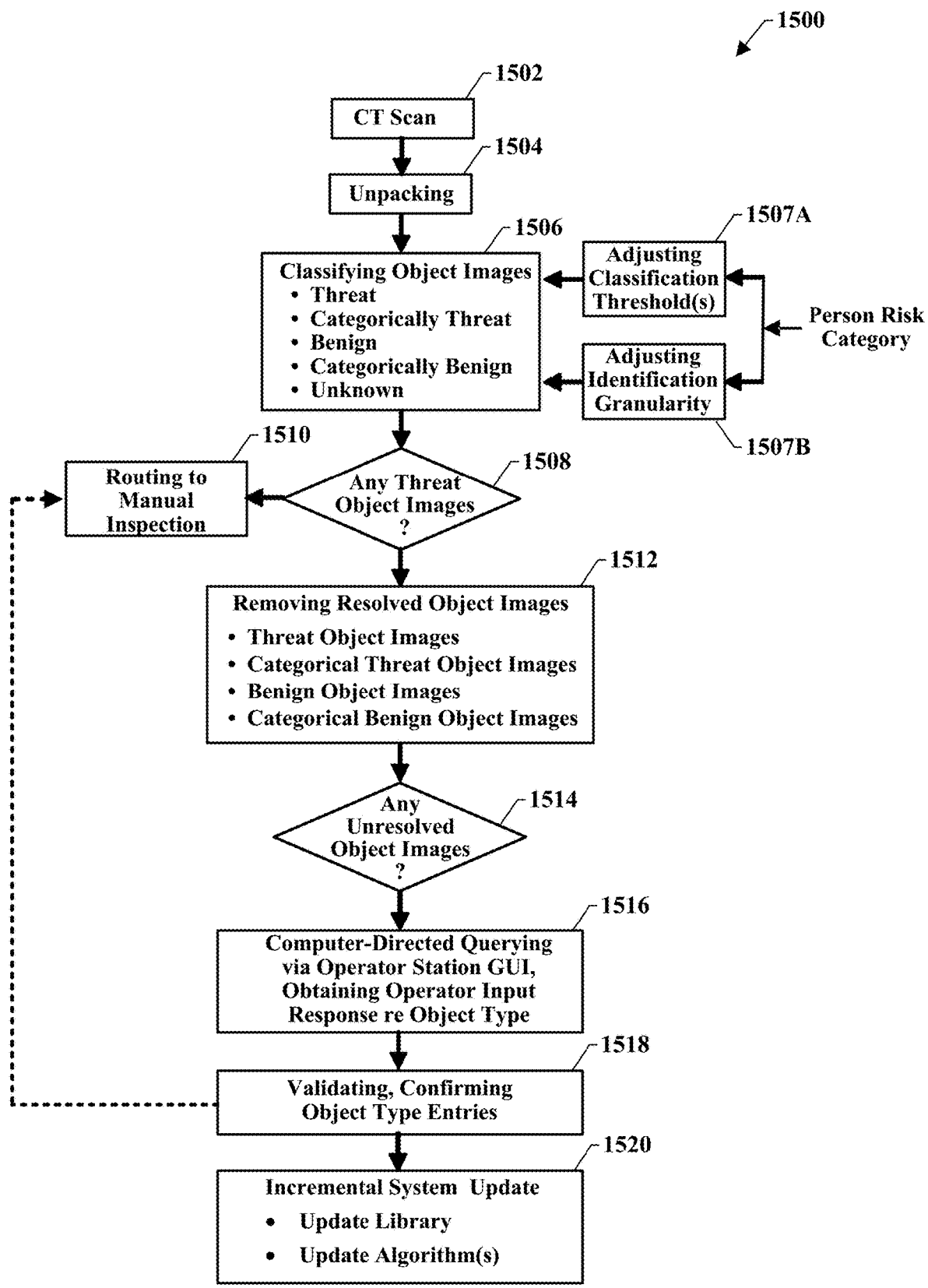
FIG. 15 shows an example flow of operations in a processes of CT scanning, digital unpacking, removal, operator interaction, and incremental ATR updating in accordance with one or more embodiments.

FIG. 15 shows a diagram of operation flow 1500 in a method for digital unpacking of CT scan images, threat-level classification of known object image types and categoricals, computer-directed operator querying on unknowns, and incremental updating in accordance with one or more embodiments. The flow 1500 includes receiving 1502 a CT scan image of, for example, a baggage item and proceeding to digital unpacking 1504 the CT scan image. Operations in the digital unpacking 1504 can include bounding all of the object images and may include generating respective object image files that can include, for example, geometric data, CT obtained density data, and other information. Operations in the flow 1500 can proceed from digital unpacking 1504 to classifying 1506 object images, into threat classes. In an embodiment, the classifying 1506 can classify the threat levels into, for example, threat object class, categorical threat object class, benign object class, and categorical benign object class.

In an embodiment, operations in the flow 1500 can include receiving a threat category of an individual associated with the baggage item, or, for example, if the baggage item is associated with a travel group, a threat category of the group. Operations can include, in response, adjusting 1507A classification thresholds applied by the threat level classifying 1506, or adjusting 1507B granularity applied by the classifying and in measurements obtained for the classification inputs, or both. As described above, various embodiments can include applying a plurality of classification algorithms in performing the classifying 1506. A result of the adjusting 1507A of the classification thresholds applied by the threat level classifying 1506, and/or adjusting the configuration or selection of, or combination of algorithms applied in the classifying 1506 can be an adjusted threat level classification process. In an embodiment, the flow 1500 can include proceeding from classifying 1506 the threat levels of object images to a triggering operation such as determining 1508 whether there are any threat object images. In an embodiment, responsive to an affirmative determining 1508 the flow 1500 can route 1510 the baggage item to an inspection area for manual inspection. FIGS. 1 and 15, example operations in operation in routing 1510 can include an alarm from the object threat level classification logic 110 to the baggage item routing logic 114. The baggage item routing logic 114. In response, can control the first routing switch 120 to send the baggage item on route 126 to the secondary search area using, e.g., conveyance 132.

Referring to FIG. 15, either concurrent with, or sequential with routing 1510 the baggage item 1510 for manual inspection, the flow 1500 can proceed to removing 1512 threat level resolved object images. Operations in the removing 1512, in other words, can remove object images for which no operator input is required, i.e., threat object images, and benign object images. Removed threat object images can include object images determined as threat objects based on object image type, as well as object images determined s categorical threats, e.g., based on object physical parameters, with or without risk data on the individual(s) associated with baggage item. Similarly, removed benign object images can include objects images determined benign based on object image type, or as categorically benign. The in order to send the operator(s) only the non-resolved object images. It will be understood that "removing" in this context of "removing" 1512 can be a logical operation, e.g., "removing from further consideration by operators." Above-described example operations in the removing 1512 can include, referring to FIG. 4, removing 402 benign object images, and removing 404 threat object images.

In an embodiment, flow 1500 operations after the removing 1512 can depend on whether any unresolved threat classification object images remain. If the answer is no, meaning all object images were affirmatively classified as to type, and hence as to risk level, or determined as having categorical risk level, operations can end. If there were no threat object images identified by the classification 1506 the baggage item will have traversed over FIG. 1 route 122 to the cleared baggage pick-up area. If threat object images were identified, subsequent routing of the baggage item can depend on the results of the secondary inspection.

Referring to FIG. 15, assuming the answer at 1514 is "yes," meaning there are unresolved threat level object images in the CT scan image, operations can proceed to computer directed query processes 1516, directed to resolving the threat level of all unresolved threat level object images. Above-described operations that can implement instances of the computer-directed query process can include, referring to FIGS. 1 and 4, the operator interaction, object resolution logic 116 communicating to the operator workstation 118, via the FIG. 4 communicating 406 of unresolved object images, and the workstation 118 receiving, e.g., via the FIG. 4 receiving 408, of such unresolved object images. Implementing operations can further include, for example, displaying of computer-directed queries as described in reference to FIG. 5, and reception of operator responses to the queries, for example, as described in reference to FIGS. 6A-6C, and FIG. 7. In various embodiments, computer-directed queries can provide further guidance to operators, such as described above, e.g., in reference to FIG. 10, and FIGS. 11A, 11B, and 11C.

In an embodiment, baggage items determined at 1514 as including unresolved threat level object images can be temporarily conveyed to a temporary holding areas such as the FIG. 1 temporary holding area 125. Referring to FIG. 1, example operations can include, instructions from the from the baggage item routing Operations can include a command from the object threat level classification logic 110 to the baggage item routing logic 114 that, in turn, can control the first routing switch 120 to send the baggage item on route 124 to the temporary holding area 125. Routing of the baggage from the temporary holding area 125 can depend on the resolution obtained by the computer directed query processes 1516. In an embodiment, responsive to resolution by the computer directed query processes 1516 that identifies no threat objects, instructions can be provided to the second route switching logic 136, e.g., by operator interaction, object resolution logic 116, to convey the baggage item on route 140 to the cleared baggage item areas. In like manner, in such embodiments, responsive to negative resolution by the computer directed query processes 1516, e.g., one which identifies threat objects, logic such as operator interaction, object resolution logic 116 can instruct the second route switching logic 136 to convey the baggage item on route 142 to the secondary inspection area.

In one or more embodiments, operations in the flow 1500 can include validating and confirming 1518 of operator entered object type information. Example implementations of such confirming and validating can include, but are not limited to, processes and operations therein as described above, e.g., in reference to FIGS. 8, 9A, 9B, 12A, and 12B.

Referring to FIG. 15, there may be instances, in operations according to one or more embodiments, in which one or more object images in a CT scan image may appear irresolvable absent manual inspection. Such instances may occur, for example, in earlier training of the systems. On the other hand, such instances may not occur. Notwithstanding, such instances may be resolved by manual inspection, as shown by the dotted line from the validating and confirming 1518 to the manual inspecting 1510.

Upon resolution from the validating and confirming 1518, the flow 1500 can proceed to incremental system updating 1520, e.g., updating the library of objects to add a new library object or by updating the algorithm(s) applied by threat level classifying 1506, or both.

Figure 16:
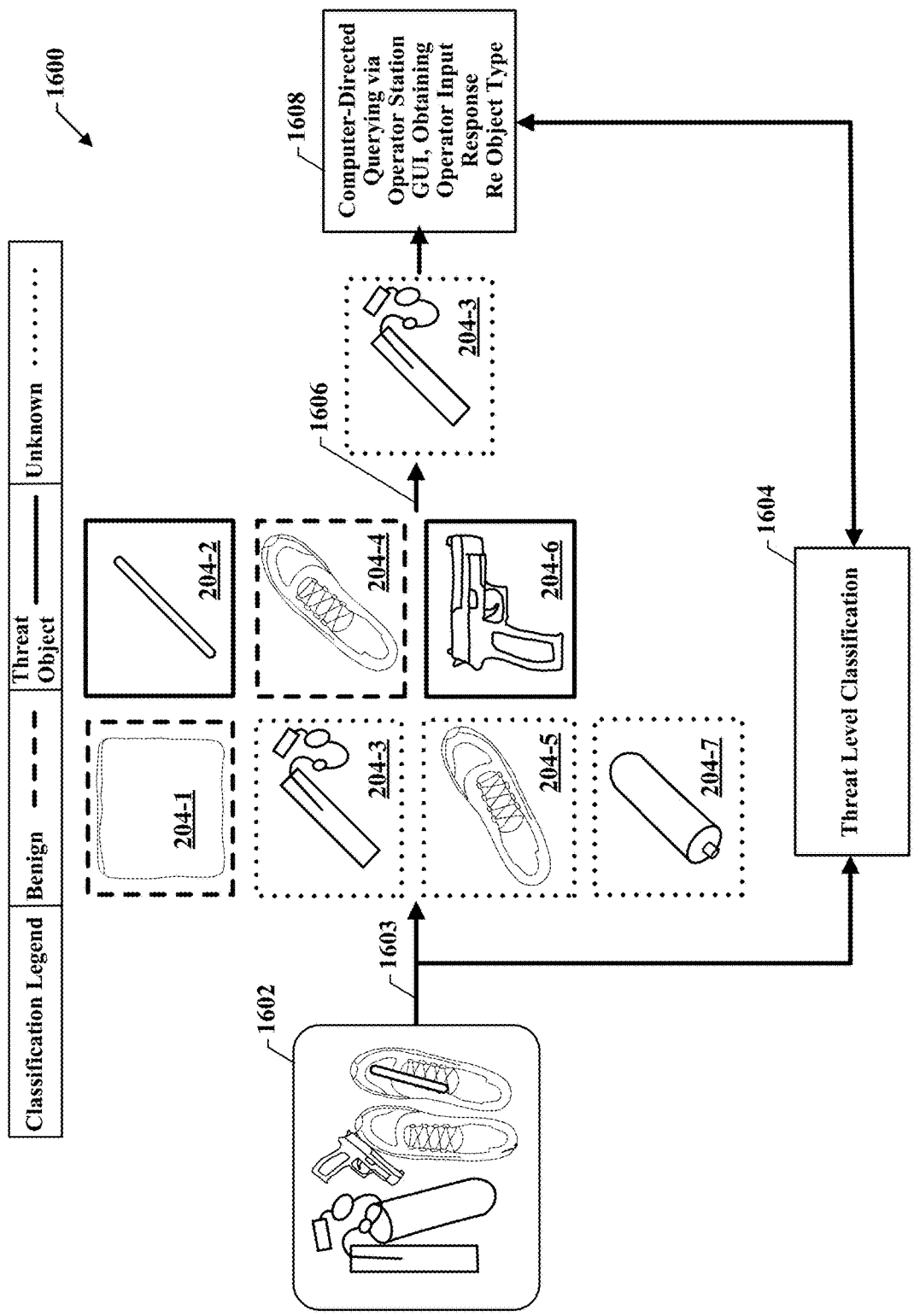
FIG. 16 is diagram of a feedback type iterative system updating 1600 in accordance with various embodiments, illustrating embodiments' inherent convergence to an all-knowing classifier through sequential updates in response to applying, upon every CT scanning, a digital unpacking, removing known type object images, following by computer directed querying and verification of operator input.

FIG. 16 shows a logic diagram of a feedback type iterative system updating 1600 in accordance with various embodiments, illustrating embodiments' inherent convergence to an all-knowing classifier through sequential updates in response to applying, upon every CT scanning, a digital unpacking, removing known type object images, following by computer directed querying and verification of operator input. Referring to FIG. 16, operations can include receiving a CT scan image 1602, digitally unpacking 1603 the CT scan image to feed the threat level classifying 1604, which classifies, in this example iteration, all of the unpacked object images 204 with the exception of the IED device 204-3. To resolve the unknown threat level in this iteration, the flow 1600 can proceed via removal 1606 to send the IED device 204-3 to the computer-directed querying 1608 via operator station GUI, and obtaining operator input response. The computer-directed querying 1608 can identify the object type of the IED device 204-3, and based thereon, can determine the IED device 204-3 a threat device. The flow 1600 can then include feedback 1610 to update the threat level classifying 1604, e.g., by adding the IED device 204-3 to the object library.

Figure 17:
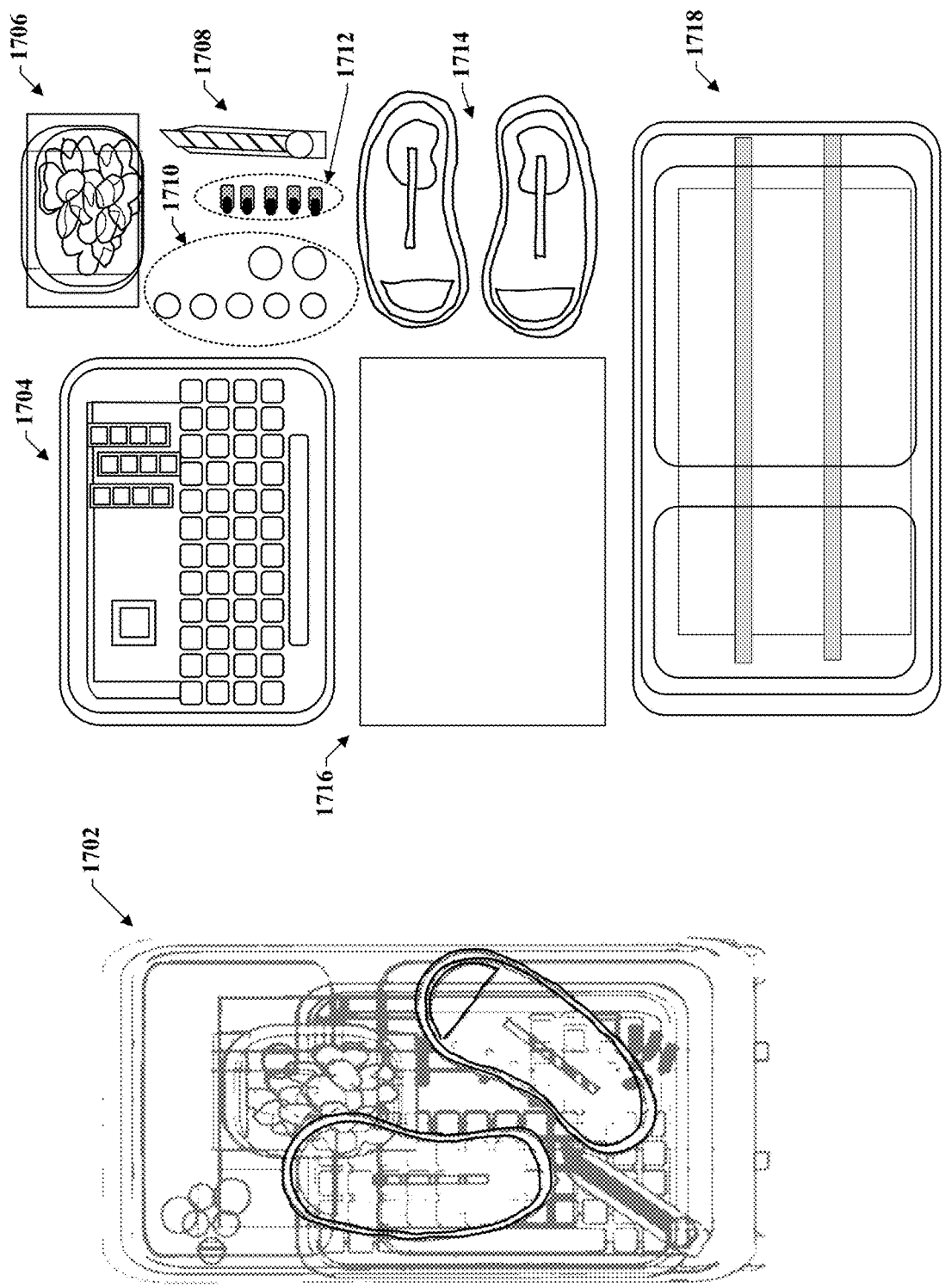
FIG. 17 shows a flow 1700 in another embodiment, featuring a combination of identifying, classifying, conferring between and among multiple ATR algorithms, determining security actions, displaying, and collecting, providing inherent iterative updating though operation.

FIG. 17 shows a portion of a flow in another embodiment, featuring a combination of identifying, classifying, conferring between and among multiple ATR algorithms, determining security actions, displaying, and collecting, providing inherent iterative updating though operation. The FIG. 17 portion incudes receiving a CT scan image 1702 of a baggage item, and digitally unpacking the CT scan image to obtain, as an assortment of content object images, a laptop computer 1704, a bag of potato chips 1706, a box cutter 1708, coins 1710, unknown objects 1712, shoes 1714, an unknown device 1716, and the baggage item 1718. It will be assumed that the object image threat level classifier, described in more detail in reference to FIGS. 18B and 19B, does not recognize the potato chips 1706. In an embodiment, multiple independent ATR algorithms can be configured to perform the unpacking or disassembly simultaneously. Alternatively, or in combination, unpacking can be performed by a central resource, e.g., in advance of CT data transition to ATRs.

Figure 18A:
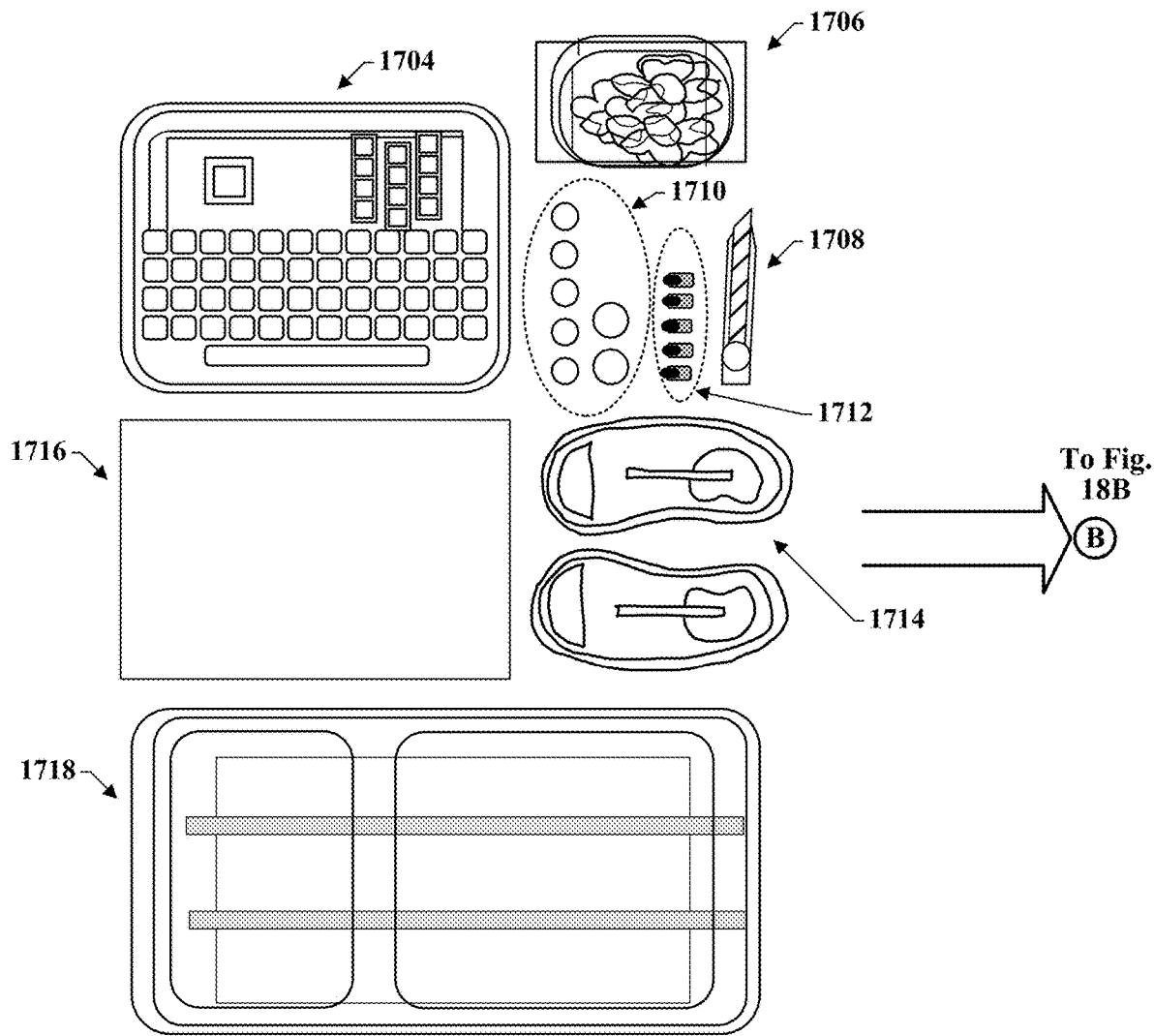
FIG. 18A shows a flow in a process including unpacking a CT scan image into separate object images.
Figure 18B:
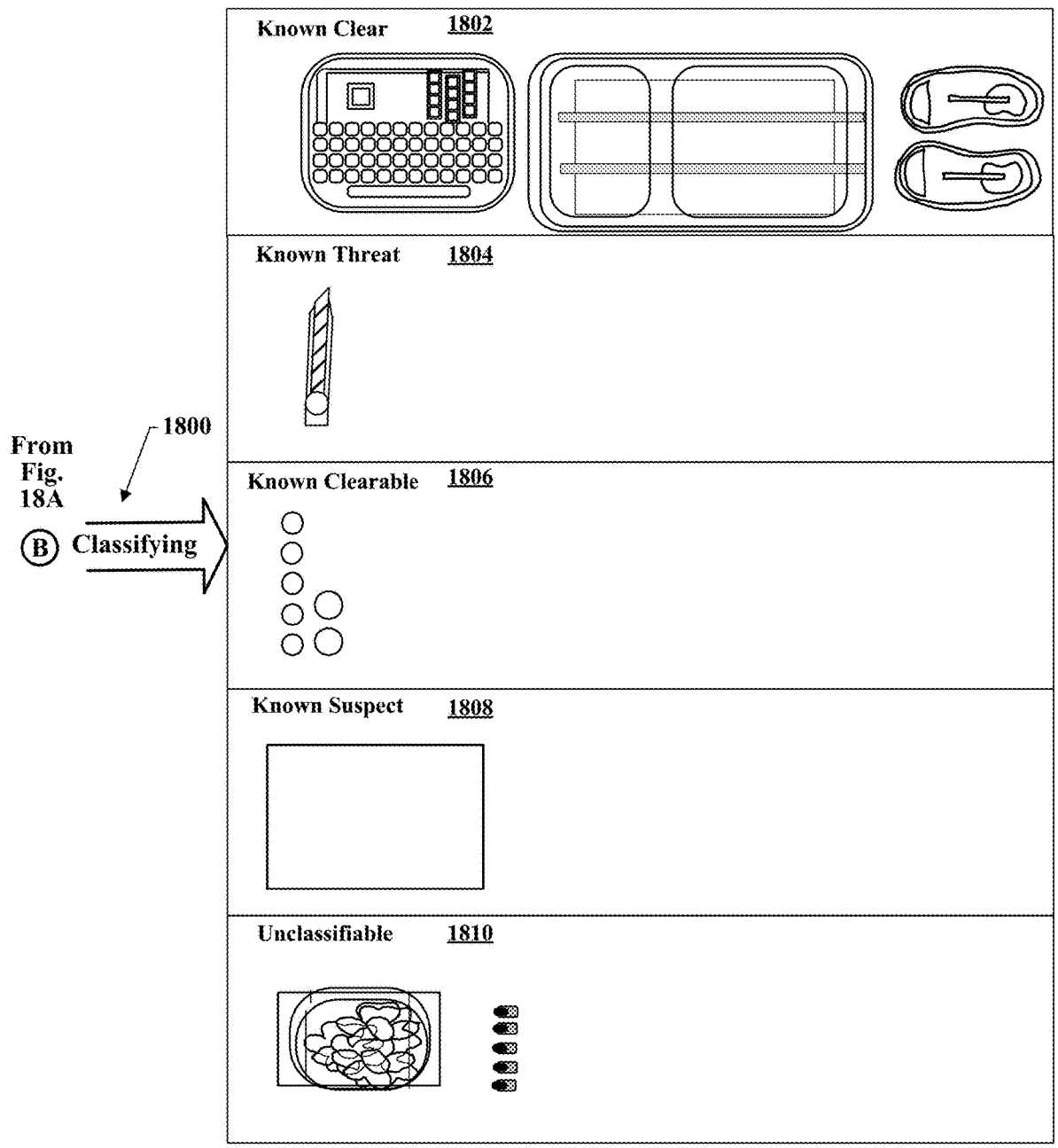
FIG. 18B show a flow in classifying the object images into actionable threat categories, in accordance with one or more embodiments.

FIG. 18A shows the digital unpacking of FIG. 17, in the context of feeding the FIG. 18B classifying 1800 of the object images into actionable threat categories, in accordance with one or more embodiments. FIG. 18B classifying 1800 can classify the threat level laptop computer 1704, the shoes 1714, and the baggage item 1702 in known clear class 1802, and the box cutter 1708 in known threat class 1804. The classifying 1800 also classifies the coins as known clearable class 1806, the unknown device 1716 as known suspect class 1808, and classifies the potato chips 1706 and unknown objects 1712 as unclassified threat level 1810.

In an embodiment, a method for adjudicating threat levels in CT scan images can include receiving a CT scan image of an item container, including object images, and digitally unpacking the object images, to obtain a plurality of unpacked object images, as described above in reference to FIG. 17 and FIGS. 18A and 18B. In embodiment, the object image threat level classifier applied above can be a first threat level classifier, and operations can include, as described above, classifying by the first threat level classifier the unpacked object images, results from the first threat level classifier including first classifier known clear, first classifier known alarm, first classifier known clearable, first classifier known suspect, and first classifier unclassifiable. In one or more embodiments, operations can also include classifying by a second threat level classifier the unpacked object images, results from the second threat level classifier including second classifier known clear, second classifier known alarm, second classifier known clearable, second classifier known suspect, and second classifier unclassifiable, and conferring between the results from the first level threat level classifier and the second level threat level classifier, and based on a result of the conferring, re-assigning the threat levels.

Figure 19A:
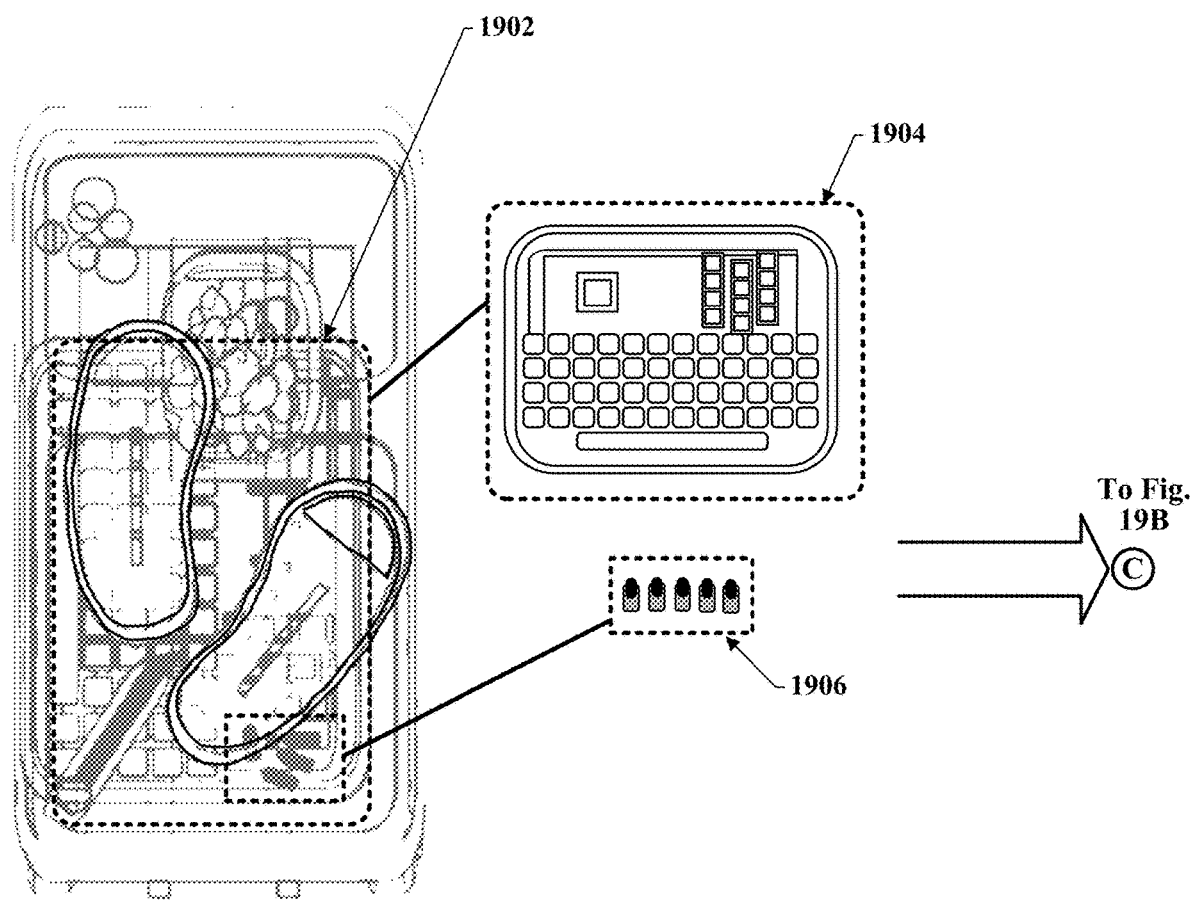
FIG. 19A shows an example application to the same object images as used in FIGS. 18A and 18B of a supplemental, different ATR in accordance with various embodiments.
Figure 19B:
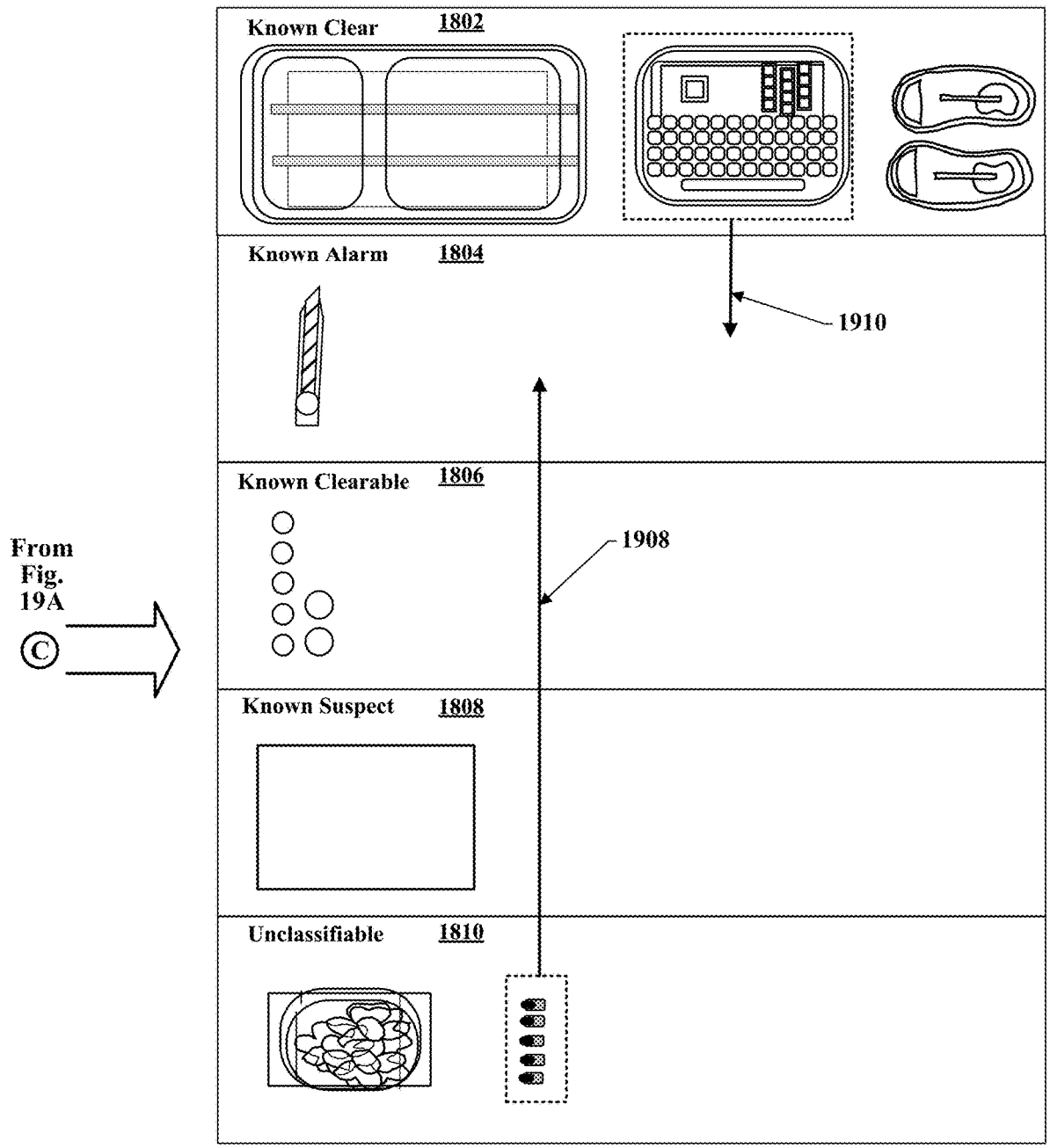
FIG. 19B shows flow of example operations of conferring among the multiple ATR classifications for conditional re-classifying of initial single ATR determined threat categories, in accordance with various embodiments.

FIG. 19A shows an example application to the same object images as used in FIGS. 18A and 18B, of a supplemental, different ATR in accordance with various embodiments. FIG. 19B shows flow of example operations of conferring among the multiple ATR classifications for conditional re-classifying of initial single ATR determined threat categories, in accordance with various embodiments.

FIG. 20A and FIG. 20B show an example determination of security outcome, utilizing preceding processes in digital unpacking, removal of identified object images, and computer-based directed query of operators for resolving unknowns, in accordance with various embodiments.

Figure 21:
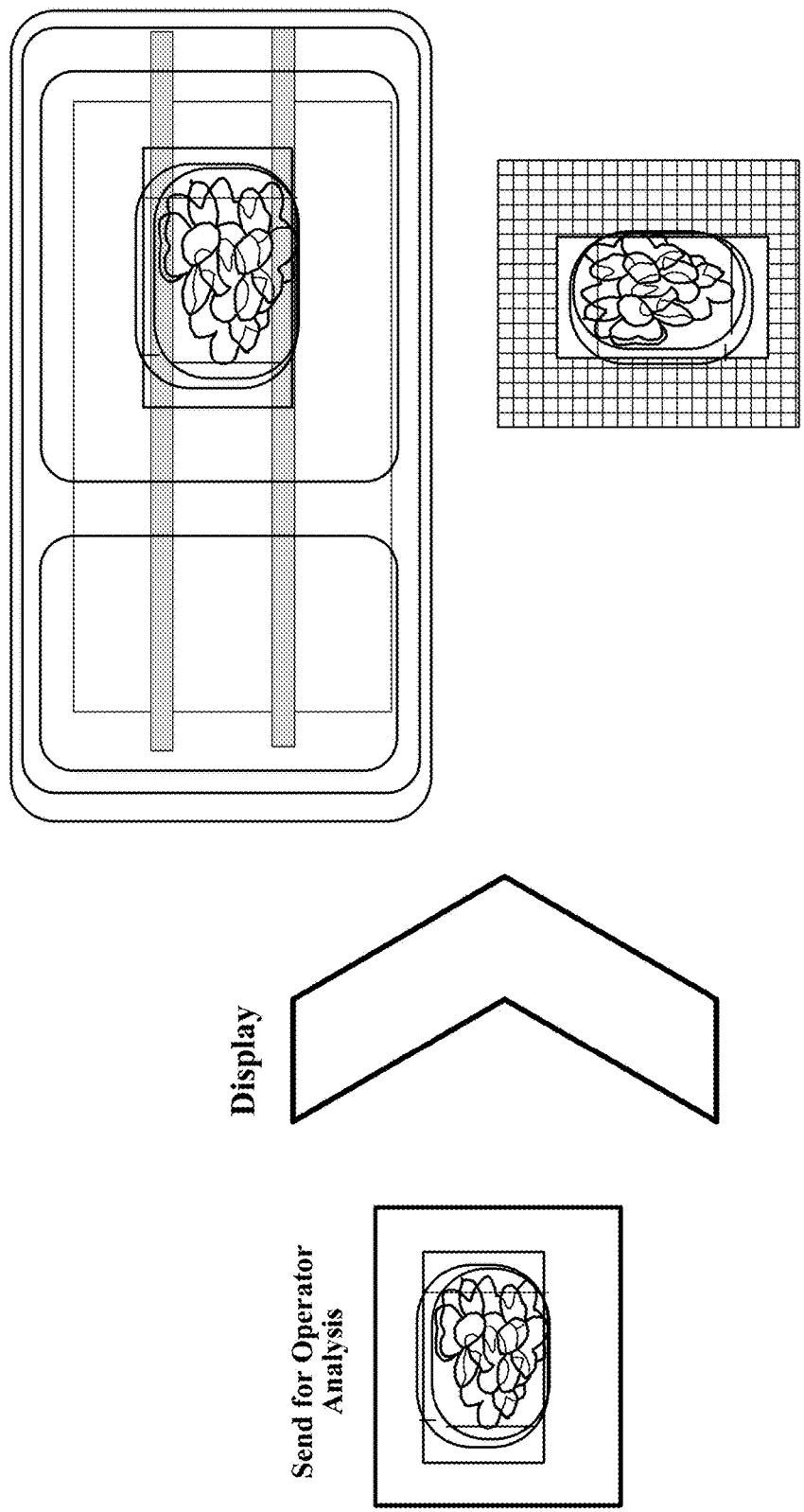
FIG. 21 shows an example configuration of a display, e.g., in an operator display, of an example unclassifiable items/objects, for computer-based, directed querying of operators, for analysis and determination.

FIG. 21 shows an example configuration of a display, e.g., in an operator display, of an example unclassifiable items/objects, for computer-based, directed querying of operators, for analysis and determination.

Figure 22:
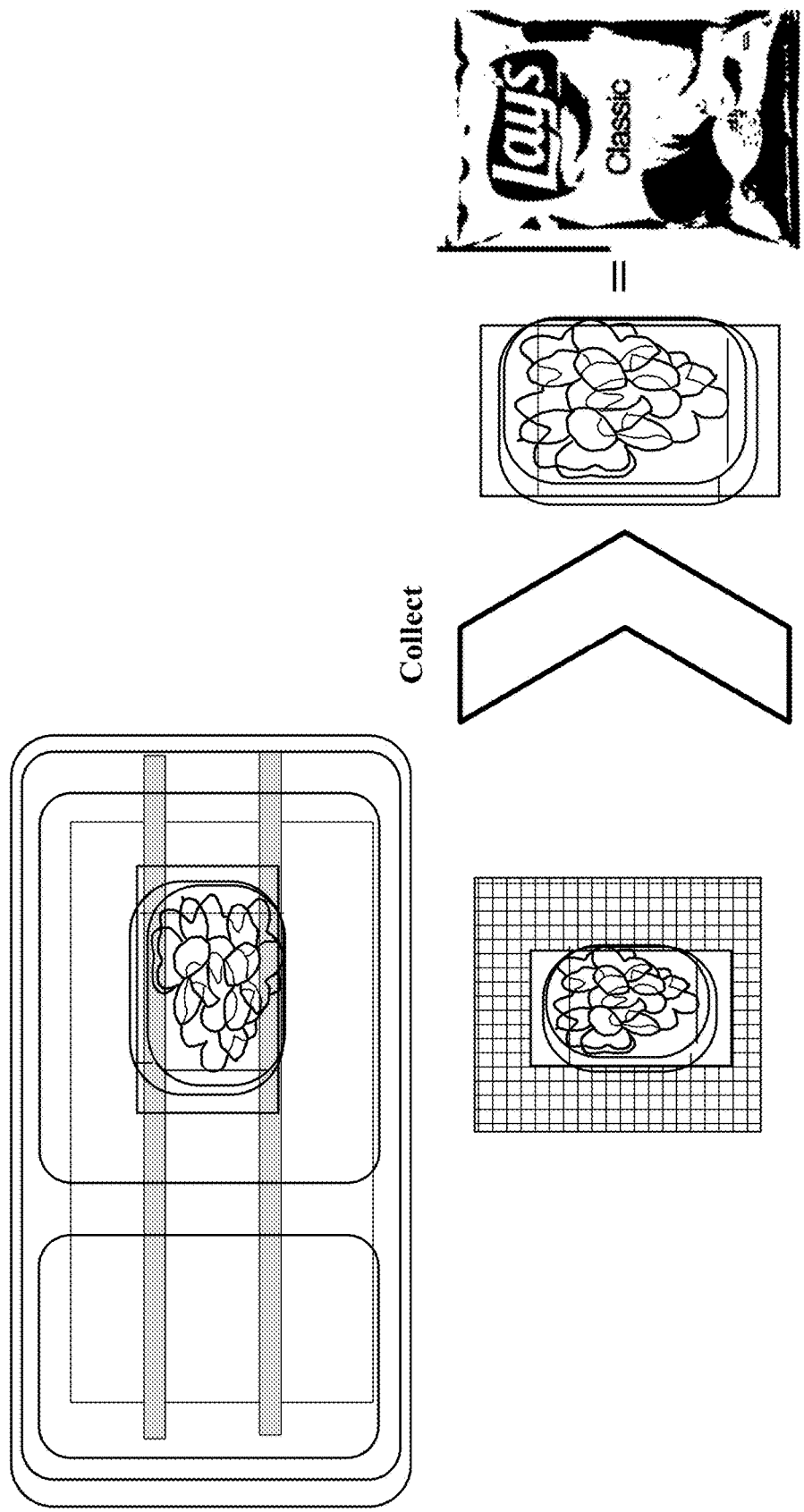
FIG. 22 shows a flow of example operation in a collection of a ground truth data on any item/object, send the ground truth date to secondary search, and associating the data to the CT image data file, or incorporation into subsequent algorithm updates in accordance with various embodiments.

FIG. 22 shows a flow in example operations in a collection of a ground truth data on an item or object, sending the ground truth date to secondary search, and associating the data to the CT image data file, or incorporation into subsequent algorithm updates in accordance with various embodiments.

FIG. 23 illustrates, in schematic form, a computing system on which aspects of the present disclosure can be practiced. The computing system 2300 can include a hardware processor 2302 communicatively coupled to an instruction memory 2304 and to a data memory 2306 by a bus 2308. The instruction memory 2404 can be configured to store, on at least a non-transitory computer readable medium as described in further detail below, executable program code 2309. The hardware processor 2302 may include multiple hardware processors and/or multiple processor cores. The hardware processor 2302 may include hardware processors from different devices that can cooperate. The computing system 2300 system may execute one or more basic instructions included in the executable program code 2310.

Relationship Between Hardware Processor and Executable Program Code

The relationship between the executable program code 2309 and the hardware processor 2402 is structural; the executable program code 2309 is provided to the hardware processor 2302 by imparting various voltages at certain times across certain electrical connections, in accordance with binary values in the executable program code 2309, to cause the hardware processor to perform some action, as now explained in more detail.

A hardware processor 2302 may be thought of as a complex electrical circuit that is configured to perform a predefined set of basic operations in response to receiving a corresponding basic instruction selected from a predefined native instruction set of codes.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor.

Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

Computer Program Product

A computer program product is an article of manufacture that has a computer-readable medium with executable program code that is adapted to enable a processing system to perform various operations and actions.

A computer-readable medium may be transitory or non-transitory.

A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

CONCLUSION

For any computer-implemented embodiment, "means plus function" elements will use the term "means;" the terms "logic" and "module" have the meaning ascribed to them above and are not to be construed as generic means. An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation. The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

What is claimed:

1. A method for adjudicating threat levels in computed tomography (CT) scan images, comprising:
    receiving a computed tomography (CT) scan image of an item container, including object images;
    digitally unpacking the object images, to obtain a plurality of unpacked object images;
    classifying by a first threat level classifier the unpacked object images, results from the first threat level classifier including first classifier known clear, first classifier known alarm, first classifier known clearable, first classifier known suspect, and first classifier unclassifiable;
    classifying by a second threat level classifier the unpacked object images, results from the second threat level classifier including second classifier known clear, second classifier known alarm, second classifier known clearable, second classifier known suspect, and second classifier unclassifiable;
    conferring between the results from the first threat level classifier and the second threat level classifier;
    based on a result of the conferring, re-assigning threat levels;
    classifying the object images between threat object images, benign object images, and unknown threat level object images; and
    generating, as a result, a set of threat object images, a set of benign object images, and a set of unknown threat level object images;
    displaying on a GUI of an operator workstation a set of subject images comprising the set of unknown threat level object images; and
    displaying, on the GUI of the operator workstation a request that the operator enter a particular information for a subject image in the set of subject images.

2. The method of claim 1 for adjudicating threat levels in CT scan images, further comprising:
    applying an object bounding process to the CT scan image, configured to detect boundaries of the object images; and
    identifying the object images, based at least in part on the boundaries.

3. The method of claim 1 for adjudicating threat levels in CT scan images, further comprising,
    the request that the operator enter the particular information for the subject image in the set of subject images includes a request that the operator indicate, by first type of click indications, the subject images that the operator assigns as threat object images and, by second type of click indications, the subject images that the operator does not assign as threat object images.

4. The method of claim 3 for adjudicating threat levels in CT scan images, further comprising:
    communicating to the GUI of the operator workstation, with the set of subject images, a data for displaying positions and arrangements of the subject images relative to positions and arrangements of context object images that appeared in the CT image with the subject images, at least one of the context object images not being among subject images; and
    responsive to the operator indicating a context request, via the GUI of the operator workstation, for a particular subject image, displaying on the GUI of the operator workstation the particular subject image together with the context object images.

5. The method of claim 4 for adjudicating threat levels of CT scan images, further comprising:
    detecting, as the operator indicating the context request, the operator hovering a cursor over the subject image, for a hover trigger duration.

6. The method of claim 3 for adjudicating threat levels in CT scan images, further comprising,
    the first type of click indications on the GUI of the operator workstation including a highlighting of the display of the subject image; and
    the second type of click indications on the GUI of the operator workstation including not highlighting the display of the subject image.

7. The method of claim 3 for adjudicating threat levels in CT scan images, further comprising:
    automatically designating, as a set of subject images of unknown type, subject images the operator does not assign as threat object images; and
    based on the set of subject images of unknown type not being a null set, performing a computer directed query regarding object type, comprising:
        displaying on the GUI of the operator workstation, as a query image, a subject image among the set of unknown threat level object images,
        displaying on the GUI of the operator workstation, proximal to the query image, a text entry field and, proximal the text entry field, a prompt for the operator to enter in the text entry field a type descriptor for the query image, and
        based at least in part on an operator indication of completeness of the type descriptor, assigning the type descriptor as a type of the subject image displayed as the query image.

8. The method of claim 7 for adjudicating threat levels in CT scan images, further comprising:
    displaying in a candidate type field that is proximal to the text entry field, a sequentially updated candidate type, using a sequential update corresponding to operator sequential entry of text characters into the text entry field; and
    responsive to a user entry to the GUI of the operator workstation indicating a candidate type is correct, setting the operator's entry of the type as being complete and as being the candidate type.

9. The method of claim 7 for adjudicating threat levels in CT scan images, further comprising:
    associated with the assigning the type descriptor as the type of the subject image displayed as the query image, removing from the set of subject images of unknown type the subject image displayed as the query image; and
    conditional, after removing from the set of subject images of unknown type the subject image displayed as the query image, on the set of unknown threat level object images not being a null set:

repeating the computer directed query regarding object type, using a subject image from the set of unknown threat level object images as another query image, and removing from the set of unknown threat level object images the subject image used as the another query image.

10. The method of claim 7 for adjudicating threat levels in CT scan images, further comprising:

validating operator-indicated type of the query image, including:

displaying on the GUI of the operator workstation, the query image, an image of a library object, and at least one other object image among the subject images, the image of the library object being from an object library, the library object being of a type identical to or similar to the operator-indicated type, displaying on the GUI of the operator workstation, with the subject image, the image of the library object, and at least one other object image from the CT scan image, a request for operator confirmatory response, on the GUI of the operator workstation, between affirmative and not affirmative, as to matching between the library object and the operator-indicated type of the query image, and validating the operator-indicated type in response to the confirmatory response being affirmatory.

11. The method of claim 7 for adjudicating threat levels in CT scan images, further comprising:

sending a guidance image, to a display of a secondary screening station, for a manual inspection of the item container, the guidance image including the CT scan image of the item container, adjacent one or more of the object images.

12. The method of claim 1 for adjudicating threat levels in CT scan images, further comprising:

receiving as an input a threat classification of an individual associated with the item container;

classifying the object images between resolved threat level and unknown threat level object images includes:

adjusting an object image threat level classifier, to an adjusted threat level classification process, based at least in part on the threat classification of the individual associated with the item container, the adjusted threat level classification process being configured to classify object images between threat object images, benign object images, and unknown threat level object images; and applying the adjusted threat level classification process to the object images.

13. A computer-based system for adjudicating threat levels in computed tomography (CT) scan images of item containers, comprising:

a processor, and a tangible, non-volatile memory coupled to the processor and storing processor-executable instructions for the processor to:

receive a computed tomography (CT) scan image of an item container, including object images;

digitally unpack the object images, to obtain a plurality of unpacked object images;

classify by a first threat level classifier the unpacked object images, results from the first threat level classifier including first classifier known clear, first classifier known alarm, first classifier known clearable, first classifier known suspect, and first classifier unclassifiable;

classify by a second threat level classifier the unpacked object images, results from the second threat level classifier including second classifier known clear, second classifier known alarm, second classifier known clearable, second classifier known suspect, and second classifier unclassifiable;

confer between the results from the first threat level classifier and the second threat level classifier;

based on a result of the conferring, re-assign threat levels;

receive, as an input to the first threat level classifier and the second threat level classifier, a threat classification of an individual associated with an item container; and adjust the first threat level classifier and the second threat level classifier based at least in part on the threat classification of the individual.

14. The computer-based system of claim 13 for adjudicating threat levels in CT scan images of item containers, further comprising the processor-executable instructions further including instructions for the processor to:

perform an object bounding and separation process on image data corresponding to the CT scan image to obtain the object images;

apply an object image type classifier to the object images to classify object images among a plurality of object image types; and configure an object image threat level classifier to classify between being a threat item image and being a benign item image, based at least in part on an affirmative result from classification by the object image type classifier.

15. The computer-based system of claim 13 for adjudicating threat levels in CT scan images of item containers, further comprising the processor-executable instructions further including instructions for the processor to:

responsive to receiving operator input from an operator identifying a type for a subject image, perform a computer-directed validation of the operator input, the computer-directed validation including to:

display to the operator, on a GUI of an operator workstation, the subject image, together with an image of a library object from an object library, the library object being of a type similar to the type identified by the operator, and display to the operator, on the GUI of the operator workstation, a request for a confirmatory response as to matching between the library object and the subject image.

16. The computer-based system of claim 13 for adjudicating threat levels in CT scan images of item containers, further comprising the processor-executable instructions further including instructions for the processor to:

perform a computer directed querying of an operator, for particular information regarding one or more subject images; and responsive to a successful outcome of the computer directed querying of the operator, to perform a resolving of threat level classification between a threat item image and a benign item image, and an updating of an object image threat level classifier.

17. The computer-based system of claim 13 for adjudicating threat levels in CT scan images of item containers, further comprising the processor-executable instructions further including instructions for the processor to:

generate a decluttered image of an item by digitally removing, from image data, the object images that classify as threat object images and the object images that classify as benign object images.

18. The computer-based system of claim 13 for adjudicating threat levels in CT scan images of item containers, wherein the object image type classifier includes one or more Q-class object image classifiers, "Q" being an integer; and wherein the object image threat level classifier is based on a lookup table.

\* \* \* \* \*